United States Patent
Hamagishi et al.

(10) Patent No.: US 7,492,515 B2
(45) Date of Patent: *Feb. 17, 2009

(54) STEREOSCOPIC IMAGE DISPLAY WITH VERTICAL AND HORIZONTAL ARRANGEMENTS

(75) Inventors: Goro Hamagishi, Toyonaka (JP); Satoshi Takemoto, Ogaki (JP)

(73) Assignee: Epson Imaging Devices Corporation, Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 11/442,962

(22) Filed: May 31, 2006

(65) Prior Publication Data

US 2006/0268185 A1 Nov. 30, 2006

(30) Foreign Application Priority Data

May 31, 2005 (JP) ............................. 2005-159342
May 31, 2005 (JP) ............................. 2005-159373

(51) Int. Cl.
G02B 27/26 (2006.01)
(52) U.S. Cl. .............................. 359/465; 348/58; 349/15
(58) Field of Classification Search .......... 359/462–465
See application file for complete search history.

(56) References Cited

U.S. PATENT DOCUMENTS

| | | | |
|---|---|---|---|
| 5,410,345 A | * | 4/1995 | Eichenlaub .................. 348/59 |
| 6,049,424 A | | 4/2000 | Hamagishi |
| 7,250,923 B2 | | 7/2007 | Taira et al. |
| 2005/0062905 A1 | | 3/2005 | Kim et al. |
| 2006/0082519 A1 | * | 4/2006 | Nam et al. ..................... 345/9 |
| 2006/0126177 A1 | * | 6/2006 | Kim et al. ................... 359/465 |
| 2006/0227256 A1 | * | 10/2006 | Hamagishi et al. ............ 349/15 |

FOREIGN PATENT DOCUMENTS

| | | | |
|---|---|---|---|
| DE | 20022456 U1 | * | 10/2001 |
| EP | 0 833 183 B1 | | 4/1998 |
| JP | 03-119889 | | 5/1991 |
| JP | 2857429 | | 11/1998 |
| JP | 2004-258631 | | 9/2004 |
| WO | WO2005/006774 A1 | * | 1/2005 |

* cited by examiner

Primary Examiner—Lee Fineman
(74) Attorney, Agent, or Firm—McDermott Will & Emery LLP

(57) ABSTRACT

An image display capable of providing stereoscopic images to an observer in both of a vertically arranged state and a horizontally arranged state is obtained. This image display comprises display portion for displaying an image, a light source for applying light to the display portion, first polarization axis control part or portion for separating the light emitted from the light source into light having a first polarization axis and light having a second polarization axis in a state where at least a prescribed reference side of the display portion is arranged in a first direction and second polarization axis control portion for separating the light emitted from the light source to light having at least two different polarization axes in a state where the prescribed reference side of the display portion is arranged in a second direction intersecting with the first direction.

17 Claims, 12 Drawing Sheets

VERTICAL ARRANGEMENT

VERTICAL ARRANGEMENT

VERTICAL ARRANGEMENT

VERTICAL ARRANGEMENT

STEREOSCOPIC IMAGE DISPLAY WITH VERTICAL AND HORIZONTAL ARRANGEMENTS

BACKGROUND OF THE INVENTION

1. Field of the Invention

The present invention relates to an image display, and more particularly, it relates to an image display capable of displaying stereoscopic images.

The priority applications Nos. JP2005-159373 and JP2005-159342 upon which this patent application is based are hereby incorporated by reference.

2. Description of the Background Art

A three-dimensional image display capable of displaying three-dimensional stereoscopic images is known in general, as disclosed in Japanese Patent No. 2857429, for example.

The aforementioned Japanese Patent No. 2857429 discloses a three-dimensional image display capable of forming opening portions and blocking portions of prescribed shapes on prescribed positions of an electronic parallax barrier in a striped manner substantially perpendicularly to a line segment connecting the left and right eyes of an observer with each other by controlling the electronic parallax barrier arranged on a side of an image display surface closer to the observer with control means such as a microcomputer. In the three-dimensional image display disclosed in Japanese Patent No. 2857429, the opening portions of the electronic parallax barrier are so formed as to introduce left- and right-eye images into the left and right eyes of the observer respectively, in order to provide three-dimensional images to the observer.

On the other hand, a stereoscopic image display capable of proposing stereoscopic images to an observer by arranging a barrier provided with slitlike opening portions and blocking portions on the side of a display panel closer to the observer is proposed in general. The structure of a conventional stereoscopic image display 500 is now described with reference to FIG. 20.

As shown in FIG. 20, the conventional stereoscopic image display 50 comprises a display panel 501 for displaying images, a polarizing plate 502 arranged on a side of the display panel 501 closer to an observer 510 and a barrier 503 provided on a side of the polarizing plate 502 closer to the observer 510.

The display panel 501 has a glass substrate 501a. Further, the display panel 501 is alternately provided with pixel trains 501b and 501c extending in a direction substantially perpendicular to a line segment connecting the left and right eyes 510a and 510b of the observer 510 with each other (direction perpendicular to the plane of FIG. 20). The pixel trains 501b and 501c display images L10 and R10 to be observed by the left and right eyes 510a and 510b of the observer 510 respectively.

The barrier 503 is provided with blocking portions 503a for blocking light emitted from the display panel 501 and opening portions 503b for transmitting the light emitted from the display panel 501. The blocking portions 503a and the opening portions 503b are alternately provided to extend in the direction substantially perpendicular to the line segment connecting the left and right eyes 510a and 510b of the observer 510 with each other (direction perpendicular to the plane of FIG. 20), similarly to the pixel trains 501b and 501c of the display panel 501. The blocking portions 503a and the opening portions 503b are provided in correspondence to groups of the pixel trains 501b and 501c of the display panel 501.

A stereoscopic image display method of the conventional stereoscopic image display 500 is now described with reference to FIG. 20.

When the observer 510 observes the display panel 501 through the opening portions 503b of the barrier 503 in the conventional stereoscopic image display 500, the images L10 displayed on the pixel trains 501b of the display panel 501 are introduced into the left eye 510a of the observer 510, while the images R10 displayed on the pixel trains 501c of the display panel 501 are introduced into the right eye 510b of the observer 510. Thus, the observer 510 can observe stereoscopic images.

However, the conventional stereoscopic image display 500 shown in FIG. 20 provides stereoscopic images to the observer 510 only in vertical arrangement, for example, and it is difficult to provide stereoscopic images to the observer 510 in horizontal arrangement, for example. The three-dimensional image display according to the aforementioned Japanese Patent No. 2857429 also has a problem similar to that of the conventional stereoscopic image display 500 shown in FIG. 20.

SUMMARY OF THE INVENTION

The present invention has been proposed in order to solve the aforementioned problem, and an object of the present invention is to provide an image display capable of providing stereoscopic images to an observer in both of a vertically arranged state and a horizontally arranged state.

In order to attain the aforementioned object, an image display according to an aspect of the present invention comprises display means for displaying an image, a light source for applying light to the display means, first polarization axis control means for separating the light emitted from the light source into light having a first polarization axis and light having a second polarization axis in a state where at least a prescribed reference side of the display means is arranged in a first direction and second polarization axis control means for separating the light emitted from the light source into light having at least two different polarization axes in a state where the prescribed reference side of the display means is arranged in a second direction intersecting with the first direction, for providing a stereoscopic image to an observer by progressing either the light having the first polarization axis or the light having the second polarization axis toward the eyes of the observer in the state where the prescribed reference side of the display means is arranged in the first direction, and providing the stereoscopic image to the observer by progressing light, having at least one polarization axis, included in the light having at least two different polarization axes toward the eyes of the observer in the state where the prescribed reference side of the display means is arranged in the second direction.

As hereinabove described, the image display according to this aspect is provided with the first and second polarization axis control means for providing the stereoscopic image to the observer by progressing either the light having the first polarization axis or the light having the second polarization axis separated from the light emitted from the light source by the first polarization axis control means in the state where the prescribed reference side of the display means is arranged in the first direction and providing the stereoscopic image to the observer by progressing the light, having at least one polarization axis, included in the light having at least two different polarization axes separated from the light emitted from the light source by the second polarization axis control means in the state where the prescribed reference side of the display means is arranged in the second direction intersecting with the first direction, thereby providing the stereoscopic image to the observer in both cases of arranging the display means in the first direction (vertical direction) and the second direction (horizontal direction).

In the image display according to the aforementioned aspect, the second polarization control means preferably includes a polarization control liquid crystal panel. When employing this polarization control liquid crystal panel, the second polarization control means can easily separate the light emitted from the light source into the light having at least two different polarization axes.

In the image display according to the aforementioned aspect, the first polarization axis control means preferably includes a retardation plate. When employing this retardation plate, the first polarization axis control means can easily separate the light emitted from the light source into the light having the first polarization axis and the light having the second polarization axis.

In the image display according to the aforementioned aspect, the first polarization axis control means preferably includes a plurality of first polarization control areas for controlling the light emitted from the light source to the light having the first polarization axis and a plurality of second polarization control areas for controlling the light emitted from the light source to the light having the second polarization axis, and the plurality of first polarization control areas and the plurality of second polarization control areas are preferably arranged along a direction intersecting with both of the first direction and the second direction in the state where the prescribed reference side of the display means is arranged in the first direction. According to this structure, the image display, capable of progressing either the light having the first polarization axis or the light having the second polarization axis toward the eyes of the observer in a state substantially uniformly dispersed in the vertical and horizontal directions with the plurality of first polarization control areas and the plurality of second polarization control areas arranged along the direction (oblique direction) intersecting with both of the first and second directions, can disperse reduction of the resolution of the image of the display means in the vertical and horizontal directions. Thus, the image display can provide a stereoscopic image having small image deterioration to the observer.

In the aforementioned image display having the first polarization axis control means including the first and second polarization control areas, the display means preferably includes a plurality of dot areas for color display, and the first polarization control areas and the second polarization control areas of the first polarization axis control means are preferably arranged for the respective ones of the dot areas of the display means. According to this structure, the image display can introduce the image of the display means into the eyes of the observer in a subdivided state with the first and second polarization control areas provided for the respective ones of the dot areas. Thus, the image display can provide a stereoscopic image having smaller image deterioration to the observer.

The image display according to the aforementioned aspect preferably provides a stereoscopic image to the observer by progressing a left-eye image and a right-eye image toward the left eye and the right eye of the observer respectively with either the light having the first polarization axis or the light having the second polarization axis while arranging the prescribed reference side of the display means in the first direction, and provides the stereoscopic image to the observer by progressing the left-eye image and the right-eye image toward the left eye and the right eye of the observer respectively with the light, having at least one polarization axis, included in the light having at least two different polarization axes while arranging the prescribed reference side of the display means in the second direction intersecting with the first direction. According to this structure, the image display can easily provide the stereoscopic image to the observer in both cases of arranging the prescribed reference side of the display means in the first (vertical) direction and the second (horizontal) direction.

In the image display according to the aforementioned aspect, the second polarization axis control means preferably separates the light having the first polarization axis into light having a third polarization axis and light having a fourth polarization axis while separating the light having the second polarization axis into light having a fifth polarization axis and light having a sixth polarization axis in the state where the prescribed reference side of the display means is arranged in the second direction, for providing the stereoscopic image to the observer by progressing the left-eye image and the right-eye image toward a left eye and a right eye of the observer respectively with the light having the fourth polarization axis and the light having the sixth polarization axis in the state where the prescribed reference side of the display means is arranged in the second direction. According to this structure, the image display, capable of easily progressing the left-eye image and the right-eye image toward the left eye and the right eye of the observer respectively with the light having the fourth polarization axis and the light having the sixth polarization axis separated by the second polarization axis control means in the state where the prescribed reference side of the display means is arranged in the second direction intersecting with the first direction, can easily provide the stereoscopic image to the observer.

In the image display according to the aforementioned aspect, the second polarization axis control means preferably includes a plurality of third polarization control areas for separating the light having the first polarization axis into light having a third polarization axis and light having a fourth polarization axis and a plurality of fourth polarization control areas for separating the light having the second polarization axis into light having a fifth polarization axis and light having a sixth polarization axis, and the third polarization control areas and the fourth polarization control areas preferably extend substantially perpendicularly to a direction connecting the left and right eyes of the observer with each other and are preferably alternately arranged in a direction along the direction connecting the left and right eyes of the observer with each other in the state where the prescribed reference side of the display means is arranged in the second direction. According to this structure, the image display, capable of easily separating the light having the first polarization axis into the light having the third polarization axis and the light having the fourth polarization axis and separating the light having the second polarization axis into the light having the fifth polarization axis and the light having the sixth polarization axis, can easily progress the left-eye image and the right-eye image toward the left and right eyes of the observer respectively with the light having the fourth polarization axis and the light having the sixth polarization axis separated by the second polarization axis control means while arranging the display means in the second direction. Thus, the image display can easily provide the stereoscopic image to the observer.

In the aforementioned image display having the second polarization axis control means including the third and fourth polarization control areas, the display means preferably includes three types of dot areas for displaying the three primary colors of light respectively, the length of the third polarization control areas and the fourth polarization control areas of the second polarization axis control means in the direction along the direction connecting the left and right eyes of the observer with each other is preferably set to substantially correspond to the length of the dot areas in the direction along the direction connecting the left and right eyes of the observer with each other, and the three types of dot areas of the display means for displaying the three primary colors of light respectively are preferably so arranged as to be adjacent to each other substantially perpendicularly to the direction connecting the left and right eyes of the observer with each other in the state where the prescribed reference side of the display means is arranged in the second direction. According to this structure, the dot areas displaying the three primary colors of light respectively can be arranged on the third and fourth polarization control areas so provided as to extend substantially perpendicularly to the direction connecting the left and right eyes of the observer with each other, whereby the image display can provide a stereoscopic image having small image deterioration to the observer.

In the aforementioned image display having the second polarization axis control means including the third and fourth polarization control areas, the second polarization axis control means preferably further includes a polarization control liquid crystal panel having the third polarization control areas and the fourth polarization control areas, and the third polarization control areas and the fourth polarization control areas of the polarization control liquid crystal panel are preferably formed with electrodes for applying voltage to liquid crystals respectively, to extend in the same direction as the third polarization control areas and the fourth polarization control areas. According to this structure, the image display, capable of applying the voltage to the liquid crystals of the third and fourth polarization control areas with the electrodes of the polarization control liquid crystal panel, can easily change polarization control states of the third and fourth polarization control areas by controlling the states of applying the voltage to the liquid crystals.

In the image display according to the aforementioned aspect, the second polarization axis control means is preferably switchable between a first state transmitting either the light having the first polarization axis or the light having the second polarization axis by controlling the polarization axes and a second state transmitting both of the light having the first polarization axis and the light having the second polarization axis without controlling the polarization axes in the state where the prescribed reference side of the display means is arranged in the first direction, for providing the stereoscopic image to the observer in the first state of the second polarization axis control means transmitting either the light having the first polarization axis or the light having the second polarization axis by controlling the polarization axes in the state where the prescribed reference side of the display means is arranged in the first direction, and providing a planar image to the observer by progressing both of the light having the first polarization axis and the light having the second polarization axis toward the eyes of the observer in the second state of the second polarization axis control means transmitting both of the light having the first polarization axis and the light having the second polarization axis without controlling the polarization axes in the state where the prescribed reference side of the display means is arranged in the first direction. According to this structure, the image display can provide both of the stereoscopic and planar images to the observer by switching the second polarization axis control means between the case of providing the stereoscopic image to the observer by transmitting either the light having the first polarization axis or the light having the second polarization axis by controlling the polarization axes and the case of providing the planar image to the observer by transmitting both of the light having the first polarization axis and the light having the second polarization axis without controlling the polarization axes.

In the image display according to the aforementioned aspect, the second polarization axis control means is preferably switchable between a third state separating the light having the first polarization axis into light having a third polarization axis and light having a fourth polarization axis and separating the light having the second polarization axis into light having a fifth polarization axis and light having a sixth polarization axis while transmitting at least either the light having the fourth polarization axis or the light having the sixth polarization axis and a fourth state transmitting both of the light having the first polarization axis and the light having the second polarization axis without controlling the polarization axes in the state where the prescribed reference side of the display means is arranged in the second direction, for providing the stereoscopic image to the observer with the light having the fourth polarization axis and the light having the sixth polarization axis in the state where the prescribed reference side of the display means is arranged in the second direction and in the third state transmitting at least either the light having the fourth polarization axis or the light having the sixth polarization axis, and providing a planar image to the observer by progressing both of the light having the first polarization axis and the light having the second polarization axis toward the eyes of the observer in the state where the prescribed reference side of the display means is arranged in the second direction and in the fourth state of the second polarization axis control means transmitting both of the light having the first polarization axis and the light having the second polarization axis without controlling the polarization axes. According to this structure, the image display can provide both of the stereoscopic and planar images to the observer by switching the second polarization control means between the case of providing the stereoscopic image to the observer with the light having the fourth polarization axis and the light having the sixth polarization axis and the case of providing the planar image to the observer by transmitting both of the light having the first polarization axis and the light having the second polarization axis without controlling the polarization axes.

In the image display according to the aforementioned aspect, the first polarization axis control means is preferably integrally provided on the display means. According to this structure, the number of components can be inhibited from increase as compared with a case of providing the first polarization axis control means independently of the display means.

In this case, the first polarization axis control means preferably includes a retardation plate. When employing the retardation plate integrally provided on the display means, the first polarization axis control means can easily separate the light emitted from the light source into the light having the first polarization axis and the light having the second polarization axis.

In the aforementioned structure having the first polarization axis control means integrally provided on the display means, the display means preferably includes a display panel and a pair of polarizing plates so arranged as to hold the display panel therebetween, and the first polarization axis control means is preferably integrally formed on one of the polarizing plates. According to this structure, the image display requires no dedicated member (glass substrate, for example) for setting the first polarization axis control means, whereby the number of components can be reduced and the thickness of the image display can be reduced.

In the image display according to the aforementioned aspect, the second polarization axis control means, the first polarization axis control means, the display means and the light source may be arranged in this order from the side of the observer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of an image display 1 according to a first embodiment of the present invention is described with reference to FIGS. 1 to 10.

Figure 1:
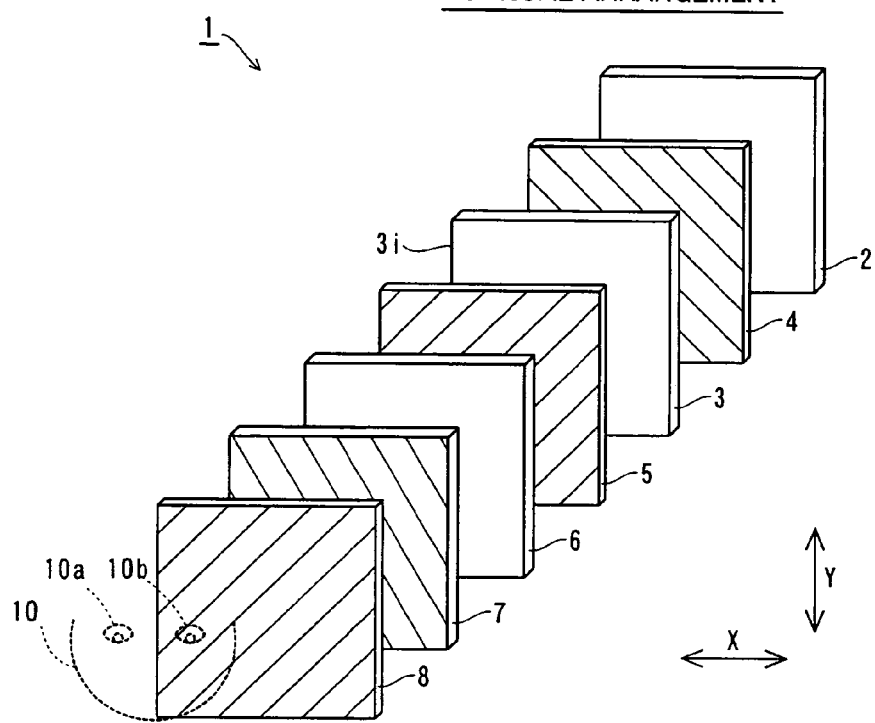
FIG. 1 is an exploded perspective view showing an image display according to a first embodiment of the present invention.

As shown in FIG. 1, the image display 1 according to the first embodiment of the present invention comprises a backlight 2, a display panel 3, arranged on a light-emitting side of the backlight 2, formed by a liquid crystal display panel displaying images, polarizing plates 4 and 5 arranged to hold the display panel 3 therebetween, a retardation plate 6 arranged on a light-emitting side of the polarizing plate 5, a polarization control liquid crystal panel 7 arranged on a light-emitting side of the retardation plate 6 and a polarizing plate 8 arranged on a light-emitting side of the polarization control liquid crystal panel 7. The backlight 2 is an example of the "light source" in the present invention, and the retardation plate 6 is an example of the "first polarization axis control means" in the present invention. The polarization control liquid crystal panel 7 and the polarizing plate 8 are examples of the "second polarization axis control means" in the present invention. According to the present invention, the "display means" is a concept including the display panel 3 and the polarizing plates 4 and 5.

The backlight 2 has a function of applying light to the polarizing plate 4. The polarizing plate 4, set to have a polarization axis of about 135° as viewed from the side of an observer 10, has a function of transmitting only light having a polarization axis of about 135° as viewed from the side of the observer 10. In the following description, each polarization axis is expressed by the angle observed from the side of the observer 10, unless otherwise stated. According to the first embodiment, the angle of each polarization axis is observed in a state where the display panel 3 is vertically arranged.

Figure 7:
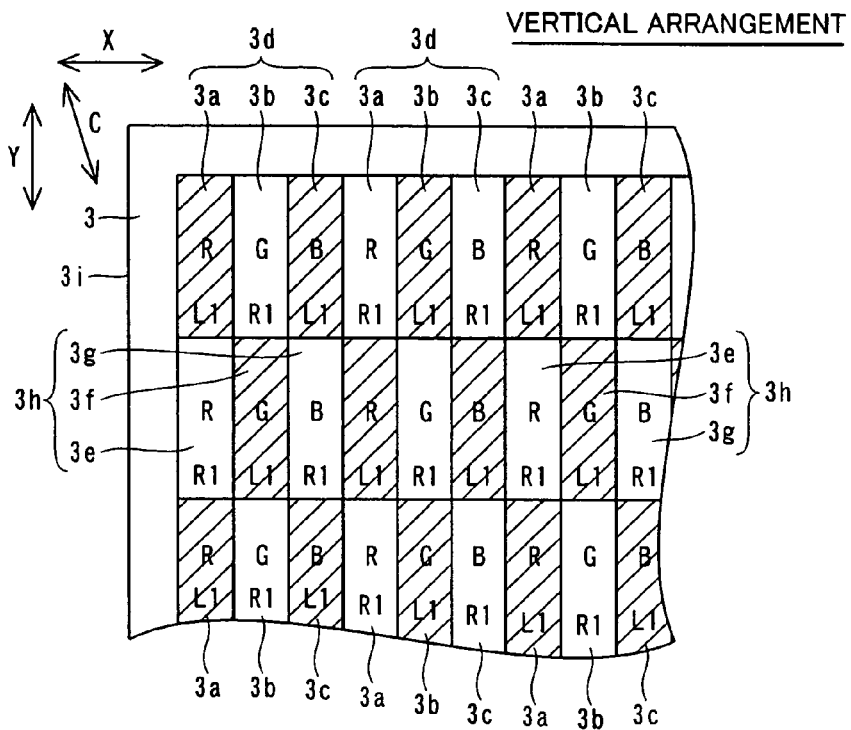
FIG. 7 is a partially enlarged view of the vertically arranged display panel of the image display according to the first embodiment of the present invention shown in FIG. 1.

The display panel 3 is formed by a TN (twisted nematic) liquid crystal panel emitting incident light while changing the polarization axis thereof by about 90° in an OFF-state and emitting the incident light without substantially changing the polarization axis thereof in an ON-state, for example. This display panel 3 has a plurality of pixel areas 3d each formed by three dot areas 3a to 3c for displaying the three primary colors of light, i.e., red (R), green (G) and blue (B) respectively and a plurality of pixel areas 3h each formed by three dot areas 3e to 3g for displaying the three primary colors of light respectively, as shown in FIG. 7. Each of the dot areas 3a to 3c and 3e to 3g is in the form of a rectangle having an aspect ratio of 1:3.

Figure 2:
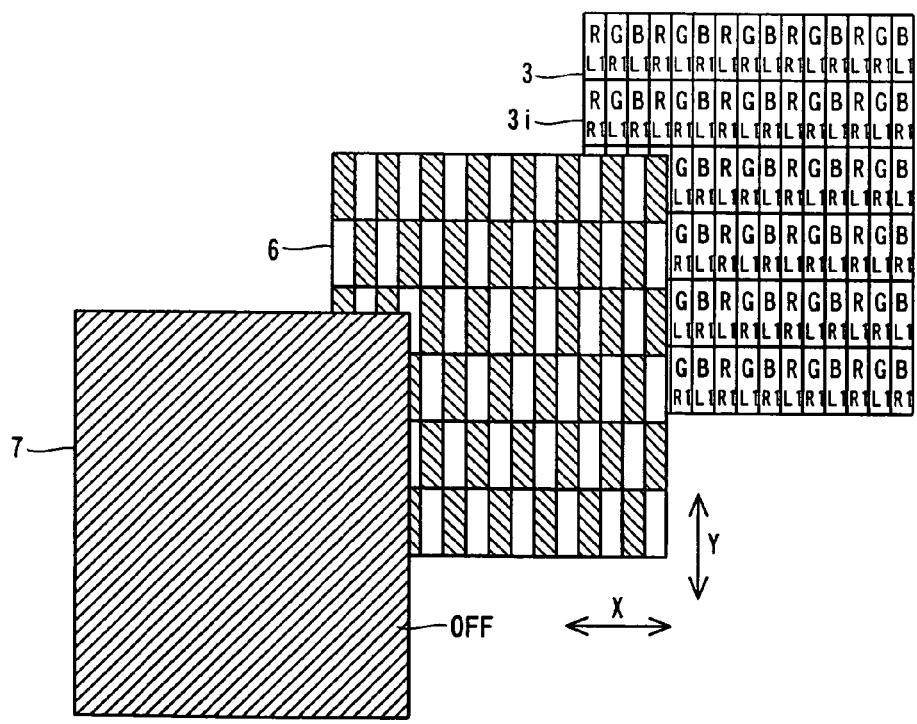
FIG. 2 illustrates a display panel, a retardation plate and a polarization control liquid crystal panel of the image display according to the first embodiment of the present invention shown in FIG. 1 in a case of vertically arranging the display panel.
Figure 3:
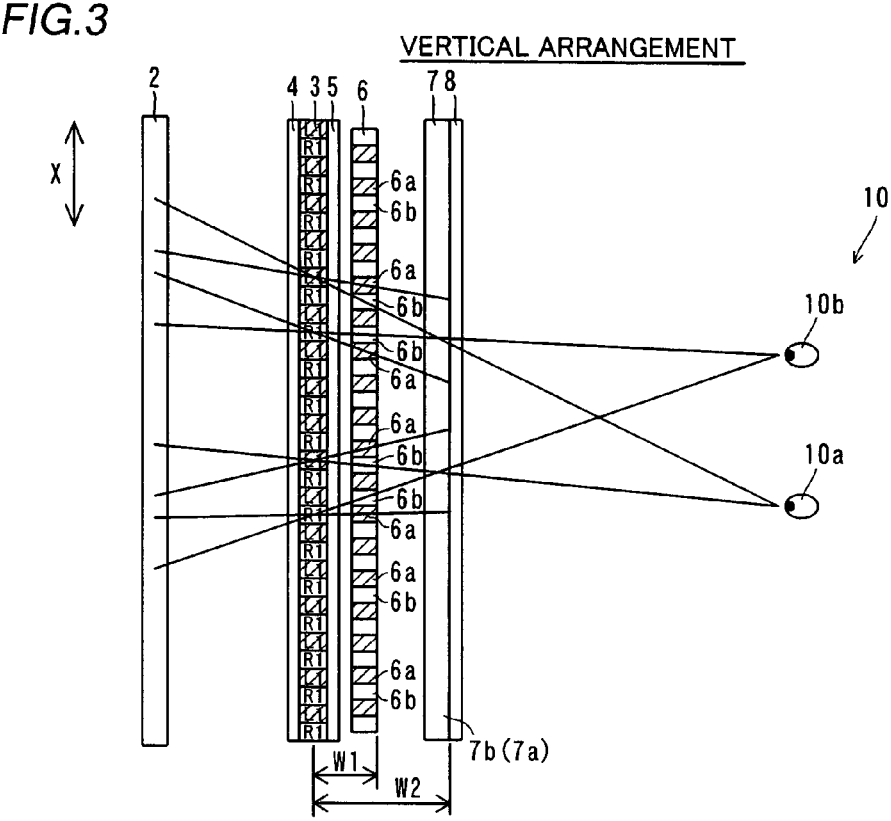
FIG. 3 illustrates the display panel of the image display according to the first embodiment of the present invention shown in FIG. 1 in a state vertically arranged for displaying stereoscopic images and observed by an observer from above.

When the display panel 3 of the image display 1 according to the first embodiment is vertically arranged (when a prescribed reference side 3i of the display panel 3 is vertically arranged in a direction Y as shown in FIGS. 2 and 3), left-eye images L1 and right-eye images R1 displayed on the dot areas 3a to 3c and 3e to 3g are arranged checkerwise (stepwise) along an oblique direction C intersecting with both of a direction X and the direction Y shown in FIG. 7. More specifically, FIG. 7 shows those of the dot areas 3a to 3c and 3e to 3g displaying the left-eye images L1 in a hatched manner (with slant lines) and those displaying the right-eye images R1 in an unhatched manner (with no slant lines). As shown in FIG. 7, the hatched RGB dot areas 3a to 3c and 3e to 3g displaying the left-eye images L1 are continuous in the oblique direction C. Further, the unhatched RGB dot areas 3a to 3c and 3e to 3g displaying the right-eye images R1 are also continuous in the oblique direction C shown in FIG. 7. The left- and right-eye images L1 and R1 are alternately displayed in the directions X and Y intersecting with the oblique direction C shown in FIG. 7, along which the RGB dot areas 3a to 3c and 3e to 3g continuously extend.

Figure 8:
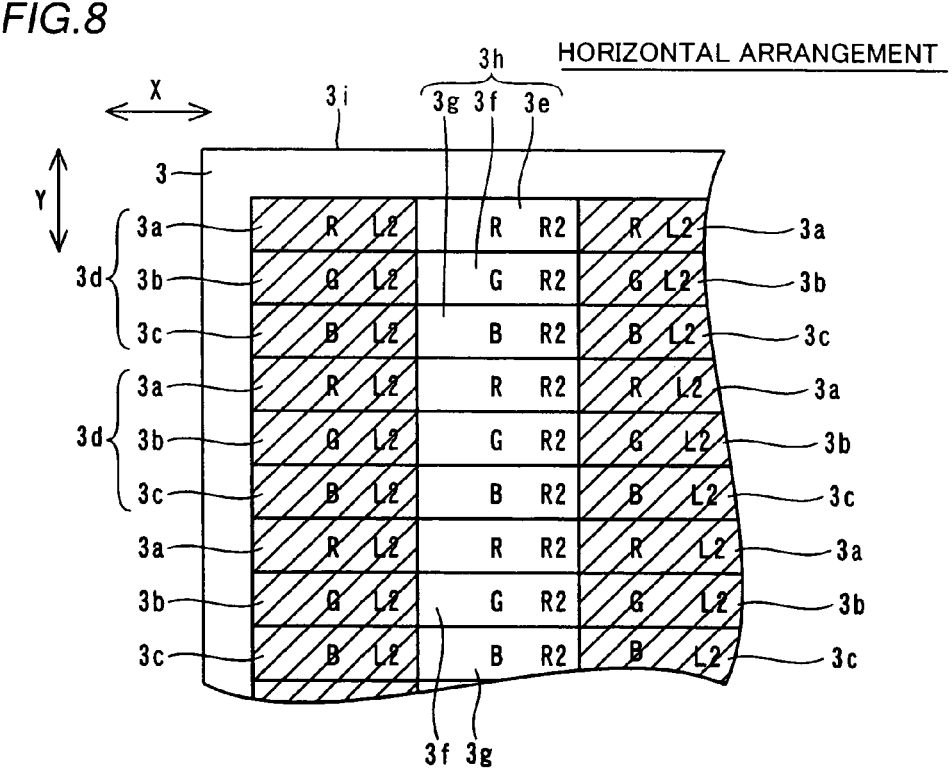
FIG. 8 is a partially enlarged view of the horizontally arranged display panel of the image display according to the first embodiment of the present invention shown in FIG. 1.

When the display panel 3 of the image display 1 according to the first embodiment is horizontally arranged, on the other hand, the dot areas 3a to 3c and 3e to 3g corresponding to the three primary colors (RGB) of light are arranged to extend in the direction Y substantially perpendicular to a line segment connecting the left and right eyes 10a and 10b of the observer 10 (see FIG. 5) with each other respectively, as shown in FIG. 8. In the horizontal arrangement (when the prescribed reference side 3i of the display panel 3 is horizontally arranged in the horizontal direction X) shown in FIG. 8, the hatched RGB dot areas 3a and 3c and 3e to 3g and the unhatched RGB dot areas 3a and 3c and 3e to 3g displaying the left- and right-eye images L1 and R2 respectively continuously extend in the vertical direction Y respectively. In the horizontal arrangement shown in FIG. 8, the left- and right-eye images L1 and R1 extending in the vertical direction Y are alternately displayed in the horizontal direction X.

Figure 9:
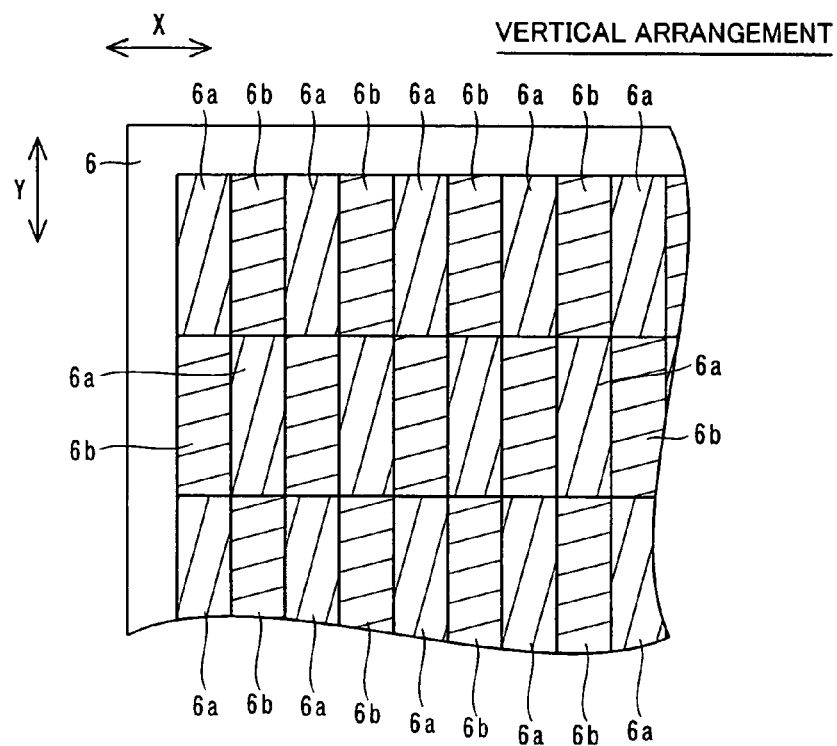
FIG. 9 is a partially enlarged diagram of the retardation plate of the image display according to the first embodiment of the present invention shown in FIG. 1.

The polarizing plate 5, set to have a polarization axis of about 45° as shown in FIG. 1, has a function of transmitting only light having a polarization axis of about 45°. The retardation plate 6 includes a plurality of polarization control areas 6a and a plurality of polarization control areas 6b, as shown in FIG. 9. The polarization control areas 6a are examples of the "first polarization control areas" in the present invention, and the polarization control areas 6b are examples of the "second polarization control areas" in the present invention. When the display panel 3 is vertically arranged (see FIGS. 2 and 3), the polarization control areas 6a are arranged on lines connecting the areas of the display panel 3 displaying the left-eye images L1 and the right eye 10b of the observer 10 with each other and lines connecting the areas of the display panel 3 displaying the right-eye images R1 and the left eye 10a of the observer 10 with each other, as shown in FIG. 3. In the following description, the terms "left eye 10a" and "right eye 10b" indicate the left and right eyes 10a and 10b of the observer 10 respectively, unless otherwise stated. The polarization control areas 6b are arranged on lines connecting the areas of the display panel 3 displaying the left-eye images L1 and the left eye 10a with each other and lines connecting the areas of the display panel 3 displaying the right-eye images R1 and the right eye 10b with each other. As shown in FIG. 9, the polarization control areas 6a and 6b of the retardation plate 6 have substantially rectangular shapes corresponding to the dot areas 3a to 3c and 3e to 3g of the vertically arranged display panel 3 shown in FIG. 7. When the display panel 3 (see FIG. 7) is vertically arranged, further, the longer sides of the polarization control areas 6a and 6b of the retardation plate 6 are arranged in the direction Y substantially perpendicular to the line segment connecting the left and right eyes 10a and 10b (see FIG. 3) with each other, similarly to the dot areas 3a to 3c and 3e to 3g of the display panel 3. The polarization control areas 6a and 6b of the retardation plate 6 have a function of changing the polarization axis of transmitted light to that line-symmetrical with respect to the polarization axis of the retardation plate 6. More specifically, the retardation plate 6, having a function of supplying a retardation λ/2 to incident light, converts light having a polarization axis of an angle α with respect to the polarization axis of the retardation plate 6, for example, to light having a polarization axis of an angle −α and discharges the same. According to the first embodiment, the polarization control liquid crystal panel 7 also has a similar function as described later.

According to the first embodiment, the polarization control areas 6a and 6b of the retardation plate 6 are arranged checkerwise (stepwise) along the oblique direction C intersecting with both of the directions X and Y shown in FIG. 7 to correspond to the areas of the display panel 3 displaying the left- and right-eye images L1 and R1 respectively, as shown in FIGS. 7 and 9. Further, each of the polarization control areas 6a has a polarization axis of about 75° as viewed from the side of the observer 10 (see FIG. 3), and each of the polarization control areas 6b has a polarization axis of about 15° as viewed from the side of the observer 10, as shown in FIG. 9.

Figure 4:
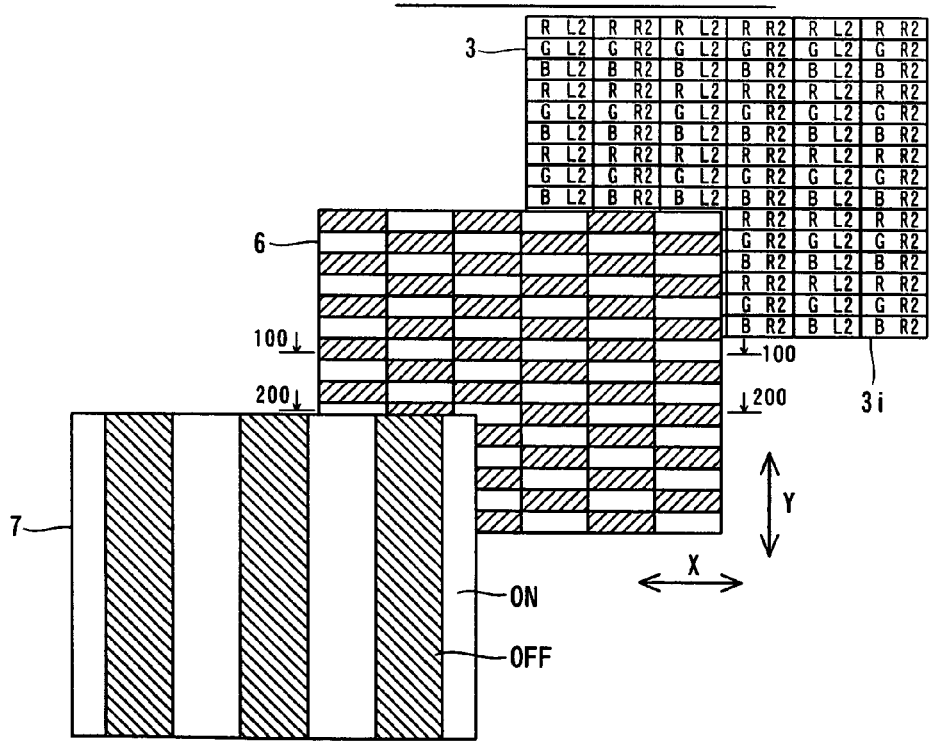
FIG. 4 illustrates the display panel, the retardation plate and the polarization control liquid crystal panel of the image display according to the first embodiment of the present invention shown in FIG. 1 in a case of horizontally arranging the display panel.
Figure 5:
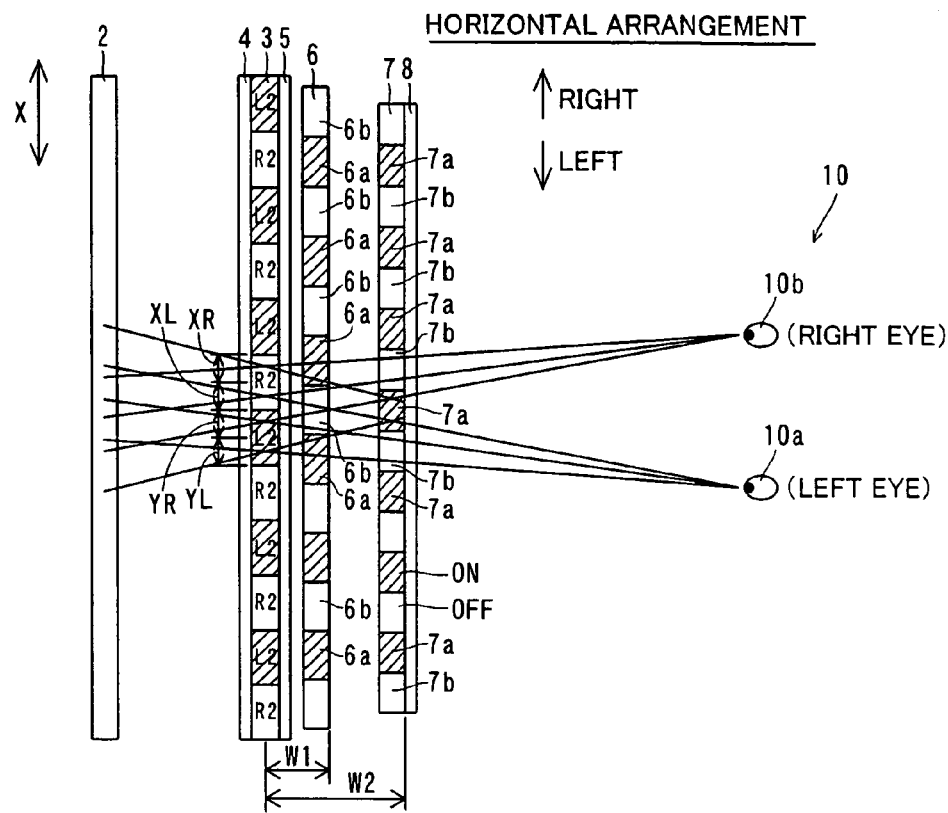
FIG. 5 illustrates the display panel of the image display according to the first embodiment of the present invention shown in FIG. 1 in a state horizontally arranged for displaying stereoscopic images and observed by the observer from above along the line 100-100 in FIG. 4.
Figure 6:
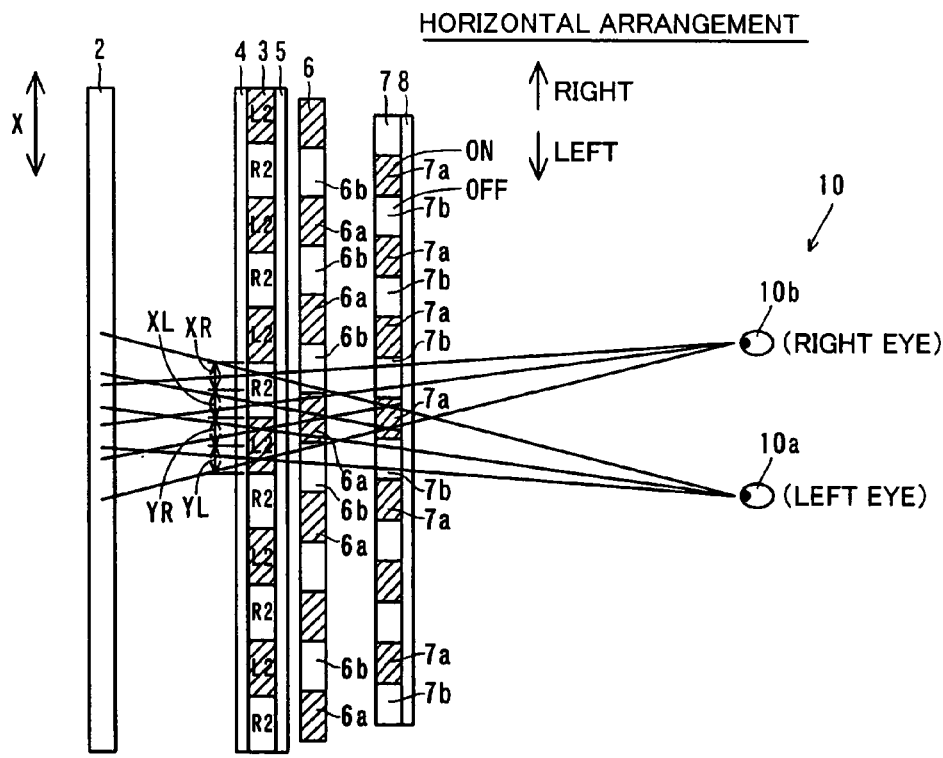
FIG. 6 illustrates the display panel of the image display according to the first embodiment of the present invention shown in FIG. 1 in the state horizontally arranged for displaying stereoscopic images and observed by the observer from above along the line 200-200 in FIG. 4.
Figure 10:
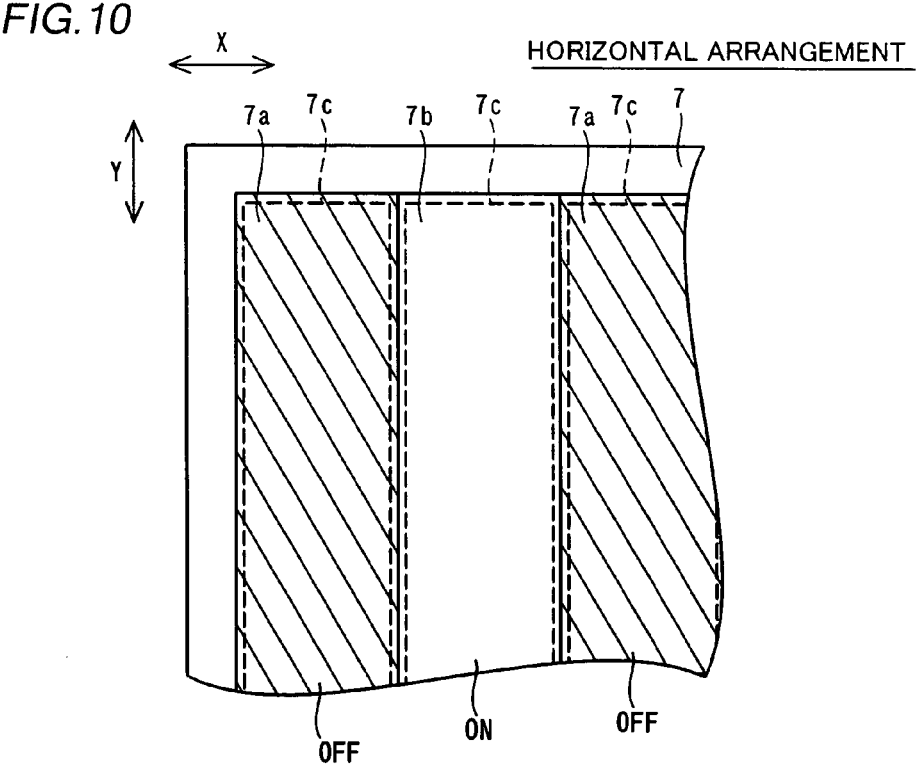
FIG. 10 is a partially enlarged diagram of the polarization control liquid crystal panel of the image display according to the first embodiment of the present invention shown in FIG. 1.

The polarization control liquid crystal panel 7 has polarization control areas 7a and 7b, as shown in FIG. 10. The polarization control areas 7a are examples of the "third polarization control areas" in the present invention, and the polarization control areas 7b are examples of the "fourth polarization control areas" in the present invention. When the display panel 3 (see FIG. 1) is horizontally arranged as shown in FIGS. 4 to 6, the polarization control areas 7a and 7b are arranged to extend in the direction Y (see FIG. 10) substantially perpendicular to the line segment connecting the left and right eyes 10a and 10b with each other. The polarization control areas 7a and 7b are provided with electrodes 7c extending in the vertical direction Y respectively. Thus, the image display 1, capable of applying voltage to liquid crystals positioned on the polarization control areas 7a and 7b of the polarization control liquid crystal panel 7 with the electrodes 7c, can easily change polarization control states of the polarization control areas 7a and 7b by controlling states of applying the voltage to the liquid crystals. Each of the polarization control areas 7a and 7b of the polarization control liquid crystal panel 7 has a polarization axis of about 120°. Further, the polarization control areas 7a and 7b of the polarization control liquid crystal panel 7 have a function of invalidating the polarization axis of about 120° and transmitting light having a prescribed polarization axis without changing the polarization axis through a voltage application state (ON-state). In addition, the polarization control areas 7a and 7b of the polarization control liquid crystal panel 7 also have a function of validating the polarization axis of about 120° and changing the polarization axis of light line-symmetrically with respect to the polarization axis through a voltage nonapplication state (OFF-state). When the display panel 3 (see FIG. 1) is vertically arranged in stereoscopic image display as shown in FIGS. 2 and 3, the polarization control areas 7*a* and 7*b* enter the voltage non-application state (OFF-state). When the display panel 3 (see FIG. 1) is horizontally arranged as shown in FIGS. 4 to 6, on the other hand, the polarization control areas 7*a* enter the voltage nonapplication state (OFF-state), while the polarization control areas 7*b* enter the voltage application state (ON-state).

When the display panel 3 (see FIGS. 5 and 6) is horizontally arranged, the length of the polarization control areas 7*a* and 7*b* of the polarization control liquid crystal panel 7 (see FIG. 10) in the horizontal direction X along the line segment connecting the left and right eyes 10*a* and 10*b* with each other substantially corresponds to the length of the dot areas 3*a* to 3*c* and 3*e* to 3*g* in the horizontal direction X along the line segment connecting the left and right eyes 10*a* and 10*b* with each other.

When the display panel 3 (see FIG. 1) is horizontally arranged as shown in FIGS. 4 to 6, the polarization control areas 7*a* of the polarization control liquid crystal panel 7 are arranged on lines connecting hatched areas displaying left-eye images L2 and the right eye 10*b* with each other and lines connecting unhatched areas displaying right-eye images R2 and the left eye 10*a* with each other, as shown in FIGS. 5 and 6. Further, the polarization control areas 7*b* of the polarization control liquid crystal panel 7 are arranged on lines connecting the hatched areas displaying the left-eye images L2 and the left eye 10*a* with each other and lines connecting the unhatched areas displaying the right-eye images R2 and the right eye 10*b* with each other.

The polarization control liquid crystal panel 7 is so arranged that the distance (W1) between the central portion of the display panel 3 in the thickness direction and a surface of the retardation plate 6 closer to the observer 10 and the distance (W2) between the central portion of the display panel 3 in the thickness direction and a surface of the polarization control liquid crystal panel 7 closer to the observer 10 are in the same ratio of about 1:3 as the aspect ratio (about 1:3) of the dot areas 3*a* to 3*c* and 3*e* to 3*g*, as shown in FIGS. 3 and 5. According to this structure, the distance between the display panel 3 and the observer 10 can be substantially uniformized whether the display panel 3 is vertically or horizontally arranged.

The polarizing plate 8 is set to have a polarization axis of about 45°, as shown in FIG. 1. The polarizing plate 8 has a function of converting incident light to light having a polarization axis of about 45° and transmitting the same.

(Stereoscopic Image Display Mode in Vertical Arrangement)

Figure 11:
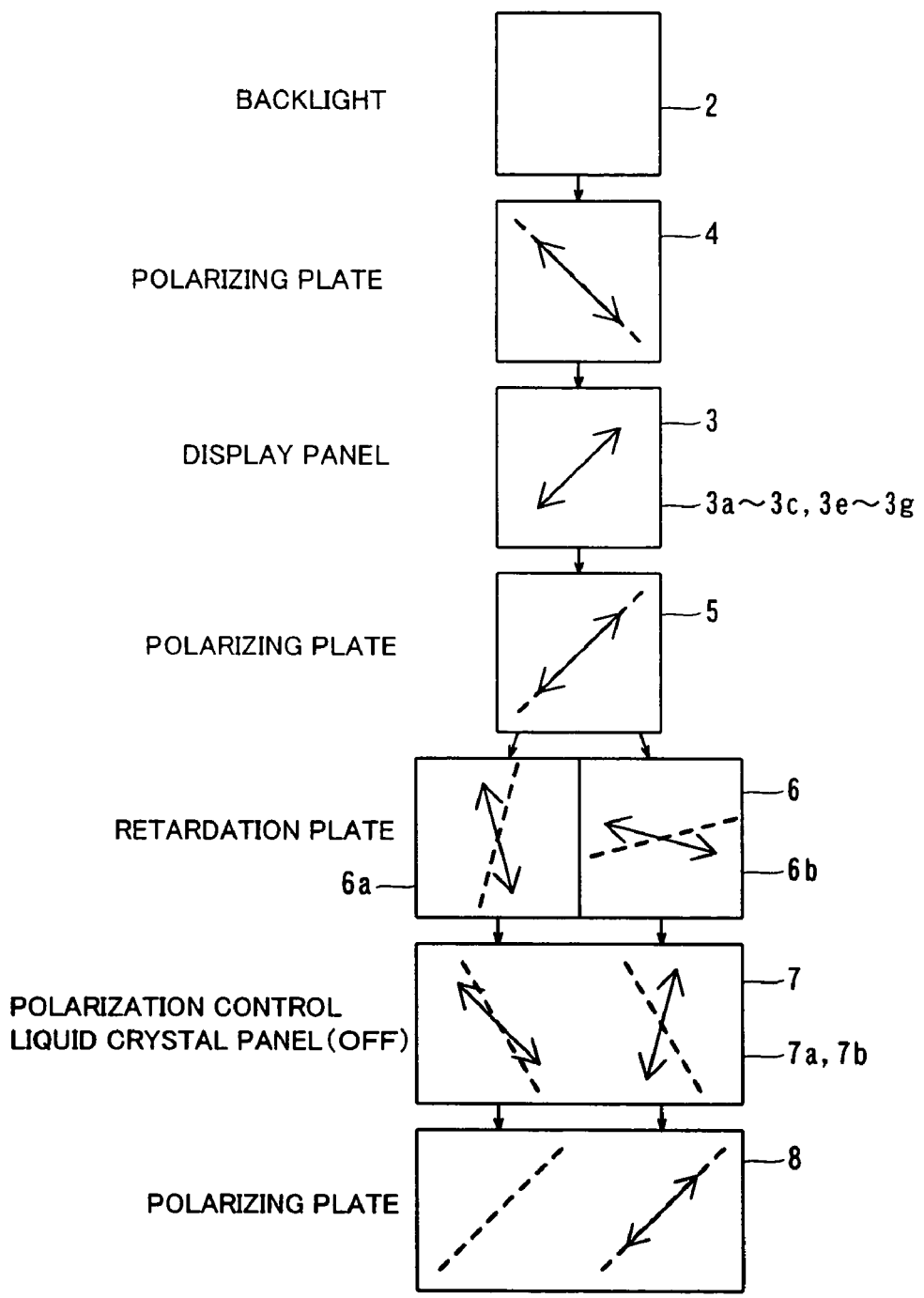
FIG. 11 is a diagram for illustrating a stereoscopic image display method in the vertical arrangement of the display panel of the image display according to the first embodiment of the present invention shown in FIG. 1.

A stereoscopic image display method in vertical arrangement of the display panel 3 of the image display 1 according to the first embodiment of the present invention is described with reference to FIGS. 3, 7, 10 and 11. Referring to FIG. 11, broken lines show the angles of the polarization axes of the polarizing plates 4, 5 and 8, retardation plate 6 and the polarization control liquid crystal panel 7 respectively, while arrows show the angles of polarization axes of transmitted light.

First, the backlight 2 (see FIG. 3) emits light, and the polarizing plate 4 transmits only light having a polarization axis of about 135° as viewed from the side of the observer 10 (see FIG. 3), as shown in FIG. 11. The light emitted from the polarizing plate 4 is incident upon the dot areas 3*a* to 3*c* and 3*e* to 3*g* of the display panel 3. In this case, the hatched ones of the dot areas 3*a* to 3*c* and 3*e* to 3*g* display the left-eye images L1 respectively and unhatched ones of the dot areas 3*a* to 3*c* and 3*e* to 3*g* display the right-eye images R1 respectively, as shown in FIG. 7. The display panel 3 emits the light incident upon the same while changing the polarization axis thereof by 90°, as shown in FIG. 11. In other words, the light transmitted through the display panel 3 has a polarization axis of about 45°. The light emitted from the display panel 3 is transmitted through the polarizing plate 5 having the polarization axis of about 45°. The light transmitted through the polarizing plate 5 is incident upon the polarization control areas 6*a* or 6*b* of the retardation plate 6.

According to the first embodiment, the light, having the polarization axis of about 45° as viewed from the side of the observer 10 (see FIG. 3), incident upon the polarization control areas 6*a* of the retardation plate 6 is converted to light having a polarization axis line-symmetrical with respect to the polarization axis of about 75° of the polarization control areas 6*a* and transmitted through the same, as shown in FIG. 11. In other words, the light emitted from the polarization control areas 6*a* has a polarization axis of about 105°. The light emitted from the polarization control areas 6*a* of the retardation plate 6 is an example of the "light having a first polarization axis" in the present invention. Then, the light emitted from the polarization control areas 6*a* of the retardation plate 6 is transmitted through the polarization control areas 7*a* and 7*b* of the polarization control liquid crystal panel 7. At this time, the polarization control areas 7*a* and 7*b* of the polarization control liquid crystal panel 7, controlled to OFF-states so that no voltage is applied to the electrodes 7*c* (see FIG. 10), have the polarization axis of about 120°. Therefore, the light incident upon the polarization control areas 7*a* and 7*b* of the polarization control liquid crystal panel 7 is converted to light having a polarization axis line-symmetrical with respect to the polarization axis of about 120° of the polarization control areas 7*a* and 7*b* of the polarization control liquid crystal panel 7 and transmitted through the same. In other words, the light emitted from the polarization control liquid crystal panel 7 has a polarization axis of about 135°. Thereafter the light emitted from the polarization control liquid crystal panel 7 is blocked by the polarizing plate 8 having the polarization axis of about 45°. The polarization control areas 6*a* of the retardation plate 6 are arranged on the lines connecting the areas of the display panel 3 displaying the left-eye images L1 and the right eye 10*b* with each other as shown in FIG. 3, whereby the left-eye images L1 can be inhibited from entering the right eye 10*b*. Further, the polarization control areas 6*a* of the retardation plate 6 are arranged on the lines connecting the areas of the display panel 3 displaying the right-eye images R1 and the left eye 10*a* with each other, whereby the right-eye images R1 can be inhibited from entering the left eye 10*a*.

On the other hand, the light incident upon the polarization control areas 6*b* of the retardation plate 6 is converted to light having a polarization axis line-symmetrical with respect to the polarization axis of about 15° of the polarization control areas 6*b* of the retardation plate 6 and transmitted through the same, as shown in FIG. 11. In other words, the light emitted from the polarization control areas 6*b* has a polarization axis of about 165°. The light emitted from the polarization control areas 6*b* of the retardation plate 6 is an example of the "light having a second polarization axis" in the present invention. Then, the light emitted from the polarization control areas 6*b* of the retardation plate 6 is transmitted through the polarization control areas 7*a* and 7*b* of the polarization control liquid crystal panel 7. At this time, the polarization control areas 7*a* and 7*b* of the polarization control liquid crystal panel 7, controlled to OFF-states so that no voltage is applied to the electrodes 7c (see FIG. 10), have the polarization axis of about 120°. Therefore, the light incident upon the polarization control areas 7a and 7b of the polarization control liquid crystal panel 7 is converted to light having a polarization axis line-symmetrical with respect to the polarization axis of about 120° of the polarization control areas 7a and 7b of the polarization control liquid crystal panel 7 and transmitted through the same. In other words, the light emitted from the polarization control liquid crystal panel 7 has a polarization axis of about 75°. Thereafter the light emitted from the polarization control liquid crystal panel 7 is converted to light having a polarization axis of about 45° and emitted from the polarizing plate 8. The polarization control areas 6b of the retardation plate 6 are arranged on the lines connecting the areas of the display panel 3 displaying the left-eye images L1 and the left eye 10a with each other as shown in FIG. 3, whereby the left-eye images L1 can be introduced into the left eye 10a. Further, the polarization control areas 6b of the retardation plate 6 are arranged on the lines connecting the areas of the display panel 3 displaying the right-eye images R1 and the right eye 10b with each other, whereby the right-eye images R1 can be introduced into the right eye 10b.

As hereinabove described, the left- and right-eye images L1 and R1 are introduced into the left and right eyes 10a and 10b respectively in the vertical arrangement, so that the observer 10 can observe stereoscopic images.

(Stereoscopic Image Display Mode in Horizontal Arrangement)

A stereoscopic image display method in horizontal arrangement of the display panel 3 of the image display 1 according to the first embodiment of the present invention is described with reference to FIGS. 5, 6, 8, 10 and 12.

Figure 12:
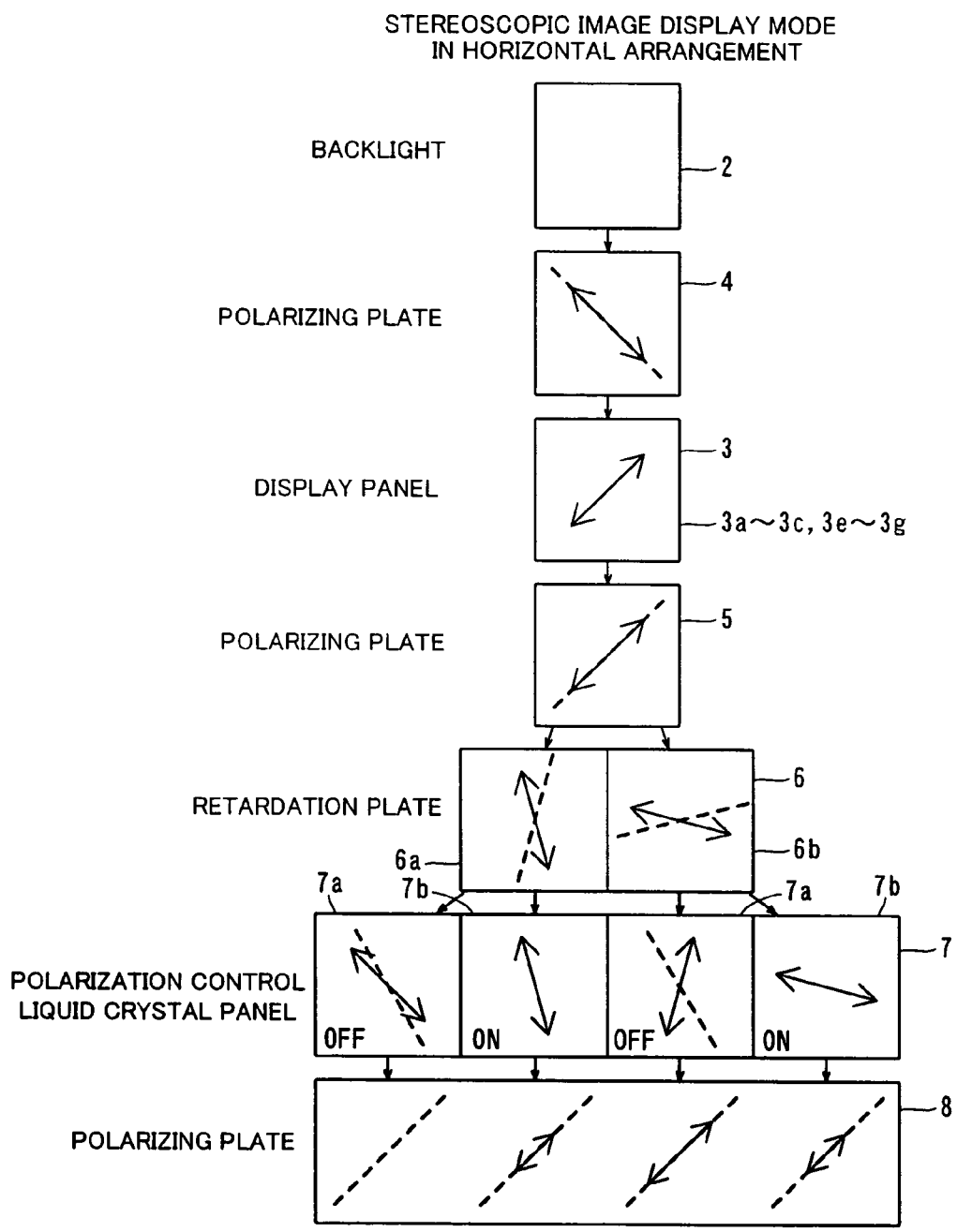
FIG. 12 is a diagram for illustrating a stereoscopic image display method in the horizontal arrangement of the display panel of the image display according to the first embodiment of the present invention shown in FIG. 1.

First, the backlight 2 (see FIGS. 5 and 6) emits light, and the polarizing plate 4 transmits only light having a polarization axis of about 135°, as shown in FIG. 12. While each polarization axis rotates by 90° in the horizontal arrangement as compared with that in the vertical arrangement, the angles of the polarization axes in the vertical arrangement are employed as such in the following description of the horizontal arrangement according to the first embodiment, in order to simplify the illustration. The light emitted from the polarizing plate 4 is incident upon the dot areas 3a to 3c and 3e to 3g of the display panel 3. In this case, the hatched ones (shown by slant lines) of the dot areas 3a to 3c and 3e to 3g display the left-eye images L2 respectively and unhatched ones of the dot areas 3a to 3c and 3e to 3g display the right-eye images R2 respectively, as shown in FIG. 8. The display panel 3 emits the light incident upon the same while changing the polarization axis thereof by 90°, as shown in FIG. 12. In other words, the light transmitted through the display panel 3 has a polarization axis of about 45° as viewed from the side of the observer 10 (see FIGS. 5 and 6). The light emitted from the display panel 3 is transmitted through the polarizing plate 5 having the polarization axis of about 45°. The light transmitted through the polarizing plate 5 is incident upon the polarization control areas 6a or 6b of the retardation plate 6.

According to the first embodiment, the light, having the polarization axis of about 45° as viewed from the side of the observer 10 (see FIG. 5), incident upon the polarization control areas 6a of the retardation plate 6 is converted to light having a polarization axis line-symmetrical with respect to the polarization axis of about 75° of the polarization control areas 6a and transmitted through the same, as shown in FIG. 12. In other words, the light emitted from the polarization control areas 6a has a polarization axis of about 105°.

In the horizontal arrangement, the polarization axis of about 120° of the polarization control areas 7a of the polarization control liquid crystal panel 7, controlled to OFF-states so that no voltage is applied to the electrodes 7c (see FIG. 10), is effective. Thus, the light emitted from the polarization control areas 6a of the retardation plate 6 and incident upon the polarization control areas 7a of the polarization control liquid crystal panel 7 is converted to light having a polarization axis line-symmetrical with respect to the polarization axis of about 120° of the polarization control areas 7a of the polarization control liquid crystal panel 7 and transmitted through the same. In other words, the light emitted from the polarization control areas 6a of the retardation plate 6 as well as the polarization control areas 7a has a polarization axis of about 135°. The light emitted from the polarization control areas 6a of the retardation plate 6 as well as the polarization control areas 7a of the polarization control liquid crystal panel 7 is an example of the "light having a third polarization axis" in the present invention. Thereafter the light emitted from the polarization control areas 7a of the polarization control liquid crystal panel 7 is blocked by the polarizing plate 8 having the polarization axis of about 45°. The polarization control areas 6a of the retardation plate 6 and the polarization control areas 7a of the polarization control liquid crystal panel 7 transmitting the light blocked by the polarizing plate 8 are arranged on the lines connecting the left eye 10a and half display areas of the display panel 3 for the right-eye images R2 (right display areas XR for the right-eye images R2 in FIG. 5 and left display areas XL for the right-eye images R2 in FIG. 6) with each other as shown in FIGS. 5 and 6, whereby half of the right-eye images R2 can be inhibited from entering the left eye 10a. Further, the polarization control areas 6a of the retardation plate 6 and the polarization control areas 7a of the polarization control liquid crystal panel 7 transmitting the light blocked by the polarizing plate 8 are arranged on the lines connecting the right eye 10b and half display areas of the display panel 3 for the left-eye images L2 (left display areas YL for the left-eye images L2 in FIG. 5 and right display areas YR for the left-eye images L2 in FIG. 6) with each other, whereby half of the left-eye images L2 can be inhibited from entering the right eye 10b.

On the other hand, the polarization axis of the polarization control areas 7b of the polarization control liquid crystal panel 7, controlled to ON-states so that voltage is applied to the electrodes 7c (see FIG. 10) in the horizontal arrangement, is invalidated. Therefore, the light emitted from the polarization control areas 6a of the retardation plate 6 and incident upon the polarization control areas 7b of the polarization control liquid crystal panel 7 is emitted with no change of the polarization axis, as shown in FIG. 12. In other words, the light emitted from the polarization control areas 6a of the retardation plate 6 as well as the polarization control areas 7b of the polarization control liquid crystal panel 7 has a polarization axis of about 105° as viewed from the side of the observer 10 (see FIG. 5). The light emitted from the polarization control areas 6a of the retardation plate 6 as well as the polarization control areas 7b of the polarization control liquid crystal panel 7 is an example of the "light having a fourth polarization axis" in the present invention. Thereafter the light emitted from the polarization control liquid crystal panel 7 is converted to light having a polarization axis of about 45° and emitted from the polarizing plate 8. The polarization control areas 6a of the retardation plate 6 and the polarization control areas 7b of the polarization control liquid crystal panel 7 are arranged on the lines connecting the right eye 10b and half display areas of the display panel 3 for the right-eye images R2 (right display areas XR for the right-eye images R2 in FIG. 5 and left display areas XL for the right-eye images R2 in FIG. 6) with each other as shown in FIGS. 5 and 6, whereby half of the right-eye images R2 can be introduced into the right eye 10b. Further, the polarization control areas 6a of the retardation plate 6 and the polarization control areas 7a of the polarization control liquid crystal panel 7 are arranged on the lines connecting the left eye 10a and half display areas of the display panel 3 for the left-eye images L2 (left display areas YL for the left-eye images L2 in FIG. 5 and right display areas YR for the left-eye images L2 in FIG. 6) with each other, whereby half of the left-eye images L2 can be introduced into the left eye 10a.

According to the first embodiment, the light, having the polarization axis of about 45° as viewed from the side of the observer 10 (see FIG. 5), incident upon the polarization control areas 6b of the retardation plate 6 is converted to light having a polarization axis line-symmetrical with respect to the polarization axis of about 15° of the polarization control areas 6b of the retardation plate 6 and transmitted through the same, as shown in FIG. 12. In other words, the light emitted from the polarization control areas 6b has a polarization axis of about 165°.

Further, the polarization axis of about 120° of the polarization control areas 7a of the polarization control liquid crystal panel 7, controlled to OFF-states so that no voltage is applied to the electrodes 7c (see FIG. 10) in the horizontal arrangement, is effective. Thus, the light emitted from the polarization control areas 6b of the retardation plate 6 and incident upon the polarization control areas 7a of the polarization control liquid crystal panel 7 is converted to light having a polarization axis line-symmetrical with respect to the polarization axis of about 120° of the polarization control areas 7a of the polarization control liquid crystal panel 7 and transmitted through the same. In other words, the light emitted from the polarization control areas 6b of the retardation plate 6 as well as the polarization control areas 7a has a polarization axis of about 75°. The light emitted from the polarization control areas 6b of the retardation plate 6 as well as the polarization control areas 7a of the polarization control liquid crystal panel 7 is an example of the "light having a fifth polarization axis" in the present invention. Thereafter the light emitted from the polarization control liquid crystal panel 7 is converted to light having a polarization axis of about 45° as viewed from the side of the observer 10 (see FIG. 5) and emitted from the polarizing plate 8. The polarization control areas 6b of the retardation plate 6 and the polarization control areas 7a of the polarization control liquid crystal panel 7 are arranged on the lines connecting the left eye 10a and half display areas of the display panel 3 for the right-eye images R2 (left display areas XL for the right-eye images R2 in FIG. 5 and right display areas XR for the right-eye images R2 in FIG. 6) with each other as shown in FIGS. 5 and 6, whereby half of the right-eye images R2 can be introduced into the left eye 10a. Further, the polarization control areas 6b of the retardation plate 6 and the polarization control areas 7a of the polarization control liquid crystal panel 7, arranged on the lines connecting the right eye 10b and half display areas of the display panel 3 for the left-eye images L2 (right display areas YR for the left-eye images L2 in FIG. 5 and left display areas YL for the left-eye images L2 in FIG. 6) with each other, introduce half of the left-eye images L2 into the right eye 10b.

On the other hand, the polarization axis of the polarization control areas 7b of the polarization control liquid crystal panel 7, controlled to ON-states so that voltage is applied to the electrodes 7c (see FIG. 10) in the horizontal arrangement, is invalidated. Therefore, the light emitted from the polarization control areas 6b of the retardation plate 6 and incident upon the polarization control areas 7b of the polarization control liquid crystal panel 7 is emitted with no change of the polarization axis, as shown in FIG. 12. In other words, the light emitted from the polarization control areas 6b of the retardation plate 6 as well as the polarization control areas 7b of the polarization control liquid crystal panel 7 has a polarization axis of about 165° as viewed from the side of the observer 10 (see FIG. 5). The light emitted from the polarization control areas 6b of the retardation plate 6 as well as the polarization control areas 7b of the polarization control liquid crystal panel 7 is an example of the "light having a sixth polarization axis" in the present invention. Thereafter the light emitted from the polarization control liquid crystal panel 7 is converted to light having a polarization axis of about 45° and emitted from the polarizing plate 8. The polarization control areas 6b of the retardation plate 6 and the polarization control areas 7b of the polarization control liquid crystal panel 7 are arranged on the lines connecting the right eye 10b and half display areas of the display panel 3 for the right-eye images R2 (left display areas XL for the right-eye images R2 in FIG. 5 and right display areas XR for the right-eye images R2 in FIG. 6) with each other as shown in FIGS. 5 and 6, whereby half of the right-eye images R2 can be introduced into the right eye 10b. Further, the polarization control areas 6b of the retardation plate 6 and the polarization control areas 7b of the polarization control liquid crystal panel 7 are arranged on the lines connecting the left eye 10a and half display areas of the display panel 3 for the left-eye images L2 (right display areas YR for the left-eye images L2 in FIG. 5 and left display areas YL for the left-eye images L2 in FIG. 6) with each other, whereby half of the left-eye images L2 can be introduced into the left eye 10a.

As hereinabove described, the left- and right-eye images L2 and R2 are introduced into the left and right eyes 10a and 10b respectively in the horizontal arrangement, whereby the observer 10 can observe stereoscopic images.

(Planar Image Display Mode in Vertical Arrangement)

Figure 13:
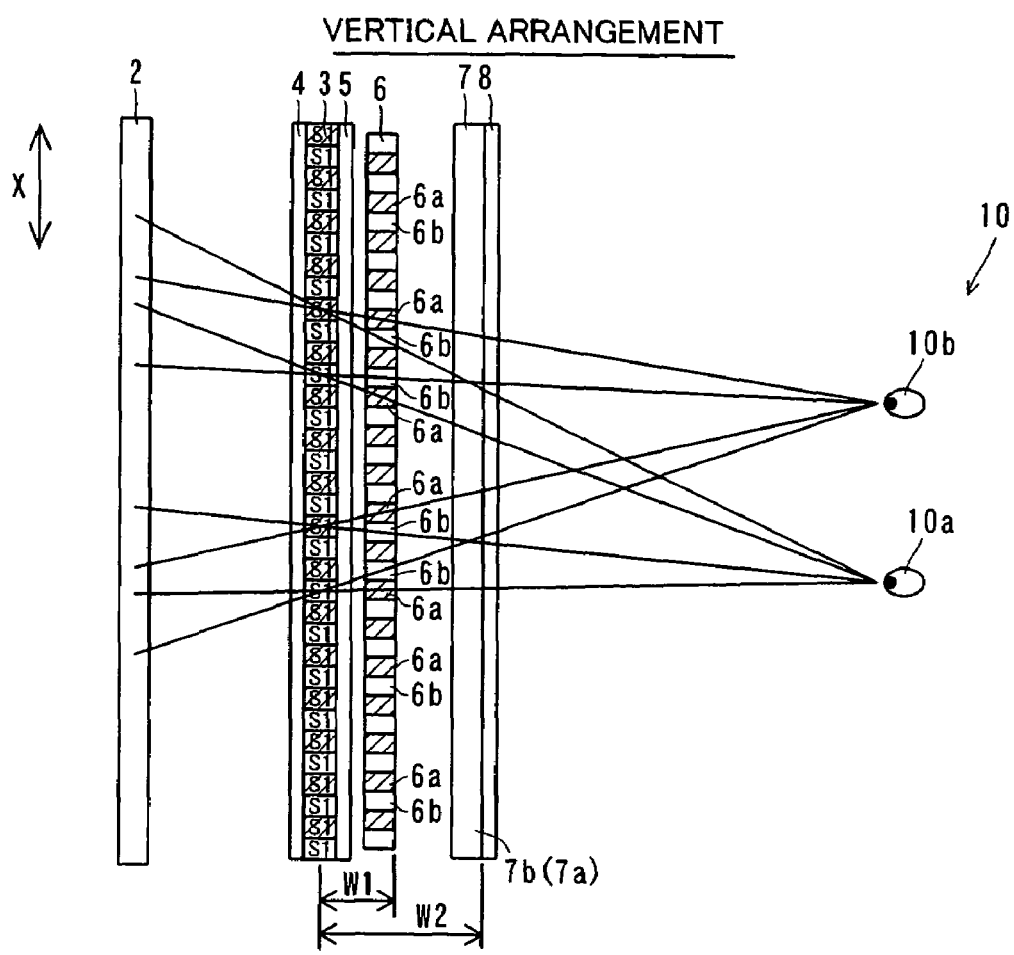
FIG. 13 illustrates the display panel of the image display according to the first embodiment of the present invention shown in FIG. 1 in a state vertically arranged for displaying planar images and observed by the observer from above.

A planar image display method in vertical arrangement of the display panel 3 of the image display 1 according to the first embodiment of the present invention is described with reference to FIGS. 13 and 14.

Figure 14:
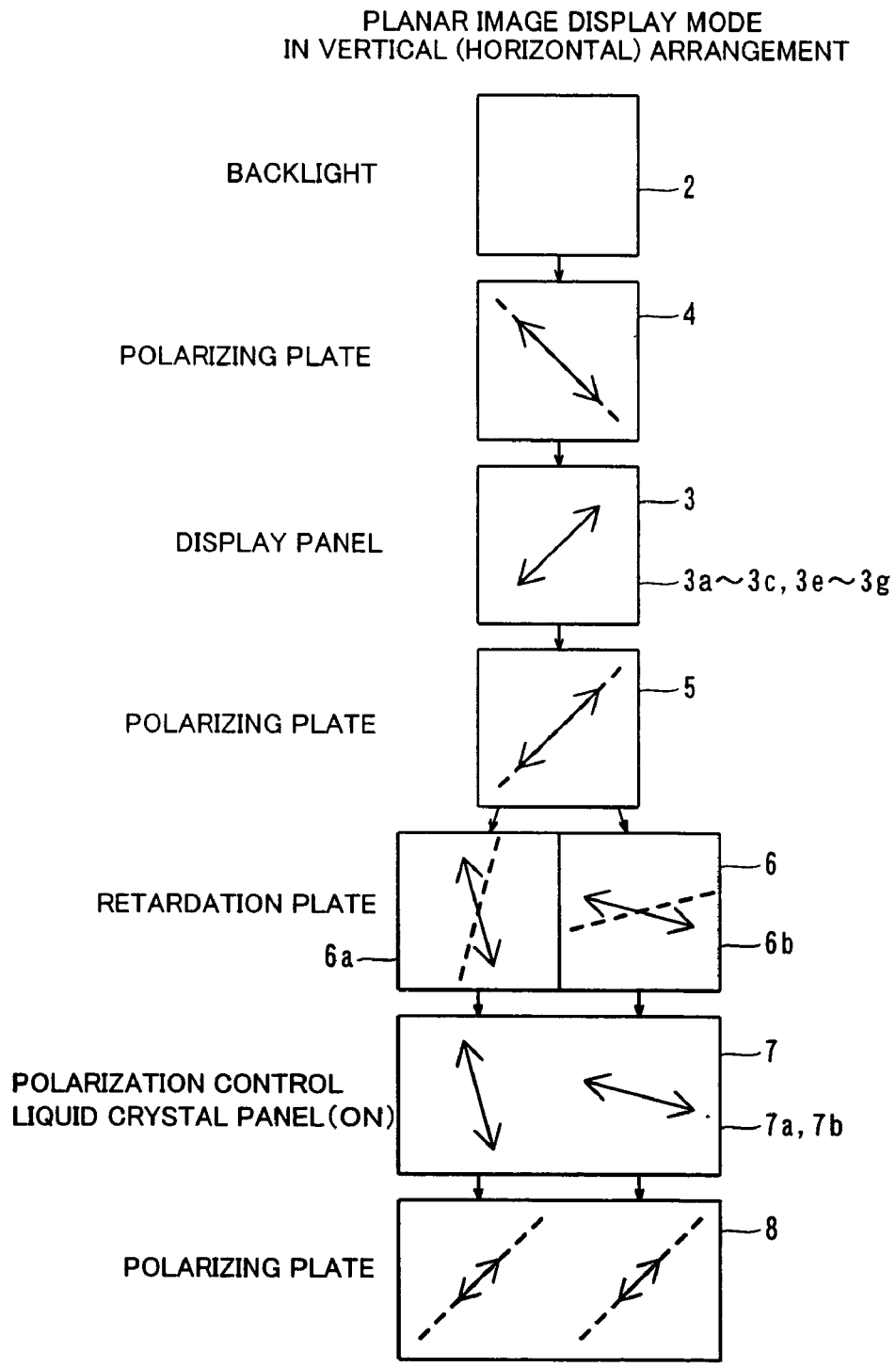
FIG. 14 is a diagram for illustrating planar image display methods in vertical arrangement and horizontal arrangement of the display panel of the image display according to the first embodiment of the present invention shown in FIG. 1.

First, the backlight 2 (see FIG. 13) emits light, and the polarizing plate 4 transmits only light having a polarization axis of about 135° as viewed from the side of the observer 10 (see FIG. 13), as shown in FIG. 14. The light emitted from the polarizing plate 4 is incident upon the display panel 3. In this case, the display panel 3 displays planar images S1, as shown in FIG. 13. The display panel 3 emits the light incident upon the same while changing the polarization axis thereof by 90°, as shown in FIG. 14. In other words, the light transmitted through the display panel 3 has a polarization axis of about 45°. The light emitted from the display panel 3 is transmitted through the polarizing plate 5 having the polarization axis of about 45°. The light transmitted through the polarizing plate 5 is incident upon the polarization control areas 6a or 6b of the retardation plate 6.

According to the first embodiment, the light, having the polarization axis of about 45° as viewed from the side of the observer 10 (see FIG. 13), incident upon the polarization control areas 6a of the retardation plate 6 is converted to light having a polarization axis line-symmetrical with respect to the polarization axis of about 75° of the polarization control areas 6a of the retardation plate 6 and transmitted through the same, as shown in FIG. 14. In other words, the light emitted from the polarization control areas 6a has a polarization axis of about 105°. The polarization axis of the polarization control liquid crystal panel 7 controlled to an ON-state is invalidated. Thus, the light incident upon the polarization control areas 7a and 7b of the polarization control liquid crystal panel 7 is emitted from the polarization control liquid crystal panel 7 with no change of the polarization axis. In other words, the light emitted from the polarization control liquid crystal panel 7 has the polarization axis of about 105°. Thereafter the light emitted from the polarization control liquid crystal panel 7 is converted to light having a polarization axis of about 45° and emitted from the polarizing plate 8. The planar images S1 of the display panel 3 corresponding to the polarization control areas 6a are introduced into the left and right eyes 10a and 10b with the light emitted from the polarizing plate 8 through the polarization control areas 6a.

On the other hand, the light incident upon the polarization control areas 6b of the retardation plate 6 is converted to light having a polarization axis line-symmetrical with respect to the polarization axis of about 15° of the polarization control areas 6b of the retardation plate 6 and transmitted through the same, as shown in FIG. 14. In other words, the light emitted from the polarization control areas 6b has a polarization axis of about 165° as viewed from the side of the observer 10 (see FIG. 13). The polarization axis of the polarization control liquid crystal panel 7 controlled to an ON-state is invalidated. Thus, the light is emitted from the polarization control areas 7a and 7b of the polarization control liquid crystal panel 7 with no change of the polarization axis. In other words, the light emitted from the polarization control liquid crystal panel 7 has the polarization axis of about 165°. Thereafter the light emitted from the polarization control liquid crystal panel 7 is converted to light having a polarization axis of about 45° and emitted from the polarizing plate 8. The planar images S1 of the display panel 3 corresponding to the polarization control areas 6b are introduced into the left and right eyes 10a and 10b with the light emitted from the polarizing plate 8 through the polarization control areas 6b.

As hereinabove described, the planar images S1 are introduced into the left and right eyes 10a and 10b, whereby the observer 10 can observe planar images.

(Planar Image Display Mode in Horizontal Arrangement)

Figure 15:
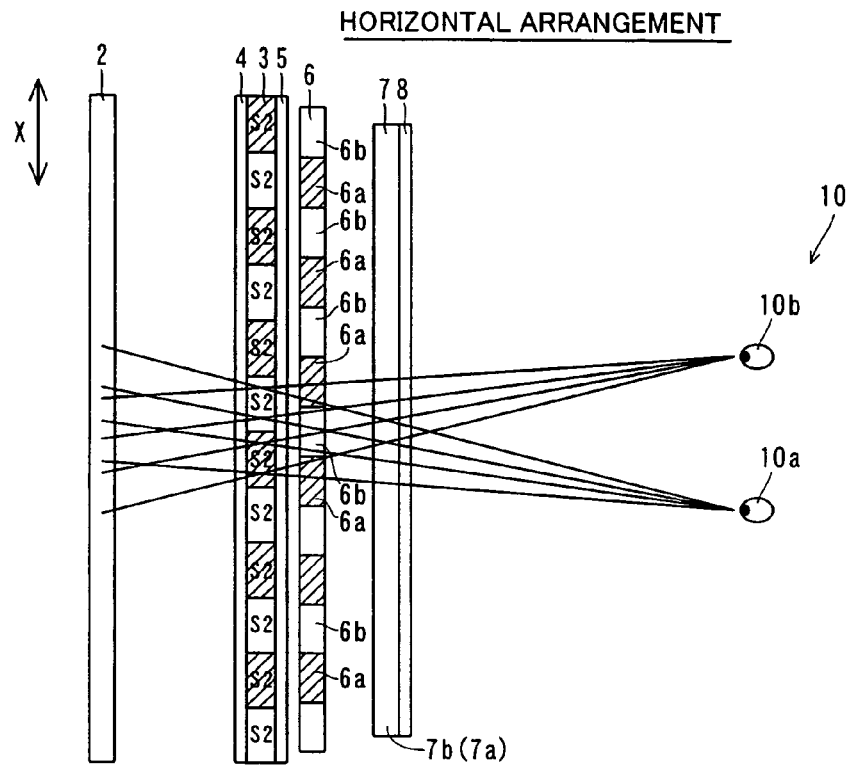
FIG. 15 illustrates the display panel of the image display according to the first embodiment of the present invention shown in FIG. 1 in a state horizontally arranged for displaying planar images and observed by the observer from above.

A planar image display method in horizontal arrangement of the display panel 3 of the image display 1 according to the first embodiment of the present invention is described with reference to FIGS. 14 and 15.

First, the backlight 2 (see FIG. 15) emits light, and the polarizing plate 4 transmits only light having a polarization axis of about 135° as viewed from the side of the observer 10 (see FIG. 15), as shown in FIG. 14. The light emitted from the polarizing plate 4 is incident upon the display panel 3. In this case, the display panel 3 displays planar images S2, as shown in FIG. 15. The display panel 3 emits the light incident upon the same while changing the polarization axis thereof by 90°, as shown in FIG. 14. In other words, the light transmitted through the display panel 3 has a polarization axis of about 45°. The light emitted from the display panel 3 is transmitted through the polarizing plate 5 having the polarization axis of about 45°. The light transmitted through the polarizing plate 5 is incident upon the polarization control areas 6a or 6b of the retardation plate 6.

According to the first embodiment, the light, having the polarization axis of about 45° as viewed from the side of the observer 10 (see FIG. 15), incident upon the polarization control areas 6a of the retardation plate 6 is converted to light having a polarization axis line-symmetrical with respect to the polarization axis of about 75° of the polarization control areas 6a of the retardation plate 6 and transmitted through the same, as shown in FIG. 14. In other words, the light emitted from the polarization control areas 6a has a polarization axis of about 105°. The polarization axis of the polarization control liquid crystal panel 7 controlled to an ON-state is invalidated. Thus, the light incident upon the polarization control areas 7a and 7b of the polarization control liquid crystal panel 7 is emitted from the polarization control liquid crystal panel 7 with no change of the polarization axis. In other words, the light emitted from the polarization control liquid crystal panel 7 has the polarization axis of about 105°. Thereafter the light emitted from the polarization control liquid crystal panel 7 is converted to light having a polarization axis of about 45° and emitted from the polarizing plate 8. The planar images S2 of the display panel 3 corresponding to the polarization control areas 6a are introduced into the left and right eyes 10a and 10b with the light emitted from the polarizing plate 8 through the polarization control areas 6a.

On the other hand, the light incident upon the polarization control areas 6b of the retardation plate 6 is converted to light having a polarization axis line-symmetrical with respect to the polarization axis of about 15° of the polarization control areas 6b of the retardation plate 6 and transmitted through the same, as shown in FIG. 14. In other words, the light emitted from the polarization control areas 6b has a polarization axis of about 165° as viewed from the side of the observer 10 (see FIG. 15). The polarization axis of the polarization control liquid crystal panel 7 controlled to an ON-state is invalidated. Thus, the light is emitted from the polarization control areas 7a and 7b of the polarization control liquid crystal panel 7 with no change of the polarization axis. In other words, the light emitted from the polarization control liquid crystal panel 7 has the polarization axis of about 165°. Thereafter the light emitted from the polarization control liquid crystal panel 7 is converted to light having a polarization axis of about 45° and emitted from the polarizing plate 8. The planar images S2 of the display panel 3 corresponding to the polarization control areas 6b are introduced into the left and right eyes 10a and 10b with the light emitted from the polarizing plate 8 through the polarization control areas 6b.

As hereinabove described, the planar images S2 are introduced into the left and right eyes 10a and 10b, whereby the observer 10 can observe planar images.

(Effects of the First Embodiment)

According to the first embodiment, as hereinabove described, the image display 1 provided with the retardation plate 6 and the polarization control liquid crystal panel 7 for providing stereoscopic images to the observer 10 by introducing the left- and right-eye images L1 and R1 into the left and right eyes 10a and 10b respectively with the light transmitted through the polarization control areas 6b of the retardation plate 6 while vertically arranging the display panel 3 and providing stereoscopic images to the observer 10 by introducing the left- and right-eye images L2 and R2 into the left and right eyes 10a and 10b respectively with the light transmitted through the polarization control areas 7b of the polarization control liquid crystal panel 7 while horizontally arranging the display panel 3 can provide stereoscopic images to the observer 10 in both of the cases of vertically and horizontally arranging the display panel 3.

According to the first embodiment, further, the retardation plate 6 is provided with the plurality of polarization control areas 6a and the plurality of polarization control areas 6b arranged checkerwise (stepwise) along the oblique direction C shown in FIG. 7 while the display panel 3 is vertically arranged so that the light transmitted through the polarization control areas 6b can be progressed toward the left and right eyes 10a and 10b in a state substantially uniformly dispersed in the vertical direction Y and the horizontal direction X with the plurality of polarization control areas 6a and the plurality of polarization control areas 6b arranged checkerwise to extend in the direction C, whereby reduction of the resolution of the left- and right-eye images L1 and R1 on the display panel 3 can be dispersed in the vertical direction Y and the horizontal direction X. Thus, the image display 1 can provide stereoscopic images having small image deterioration to the observer 10.

According to the first embodiment, in addition, the polarization control areas 6a and 6b of the retardation plate 6 are arranged for the respective ones of the dot areas 3a to 3c and 3e to 3g of the display panel 3, whereby the image display 1 can introduce the left- and right-eye images L1 and R1 displayed on the display panel 3 into the left and right eyes 10a and 10b in a state subdivided through the polarization control areas 6a and 6b provided for the respective ones of the dot areas 3a to 3c and 3e to 3g. Thus, the image display 1 can provide stereoscopic images having smaller image deterioration to the observer 10.

According to the first embodiment, further, the display panel 3 is provided with the dot areas 3a to 3c and 3e to 3g for displaying the three primary colors of light respectively to be adjacent to each other in the direction Y substantially perpendicular to the direction connecting the left and right eyes 10a and 10b with each other while the display panel 3 is horizontally arranged so that the dot areas 3a to 3c and 3e to 3g for displaying the three primary colors of light respectively can be arranged to correspond to the polarization control areas 7a and 7b provided to extend substantially perpendicularly to the direction connecting the left and right eyes 10a and 10b with each other, whereby the image display 1 can provide stereoscopic images having smaller image deterioration as compared with a case of arranging only dot areas 3a to 3c and 3e to 3g displaying a prescribed primary color on the polarization control areas 7a and 7b to the observer 10.

Second Embodiment

Figure 16:
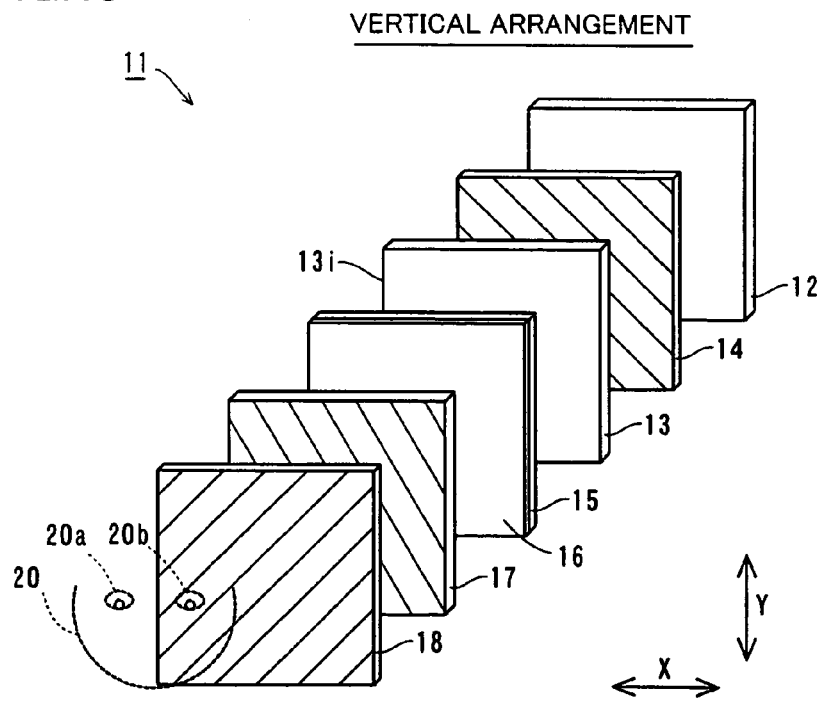
FIG. 16 is an exploded perspective view showing an image display according to a second embodiment of the present invention.
Figure 17:
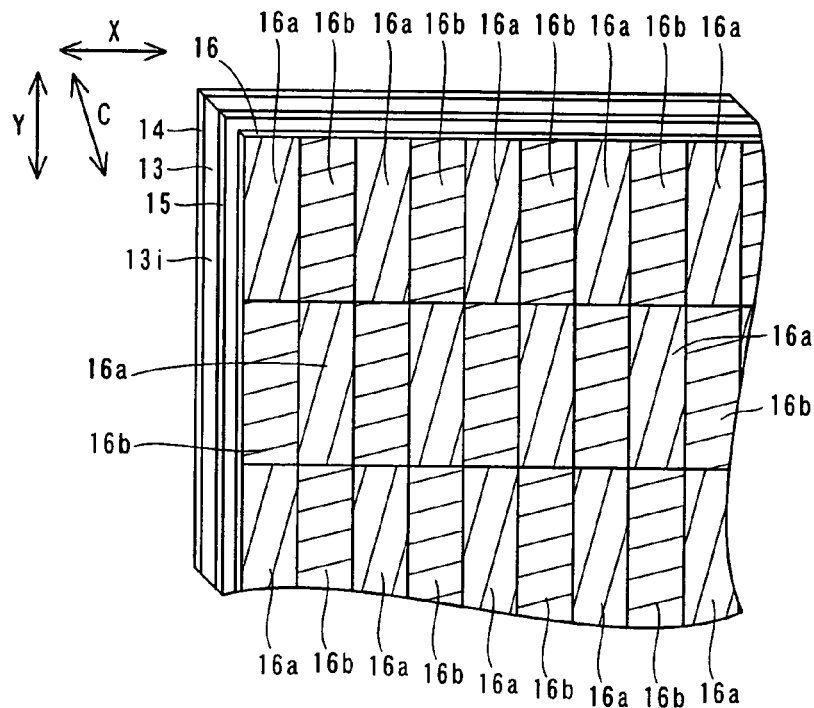
FIG. 17 is an enlarged perspective view of a retardation plate of the image display according to the second embodiment of the present invention shown in FIG. 16.
Figure 18:
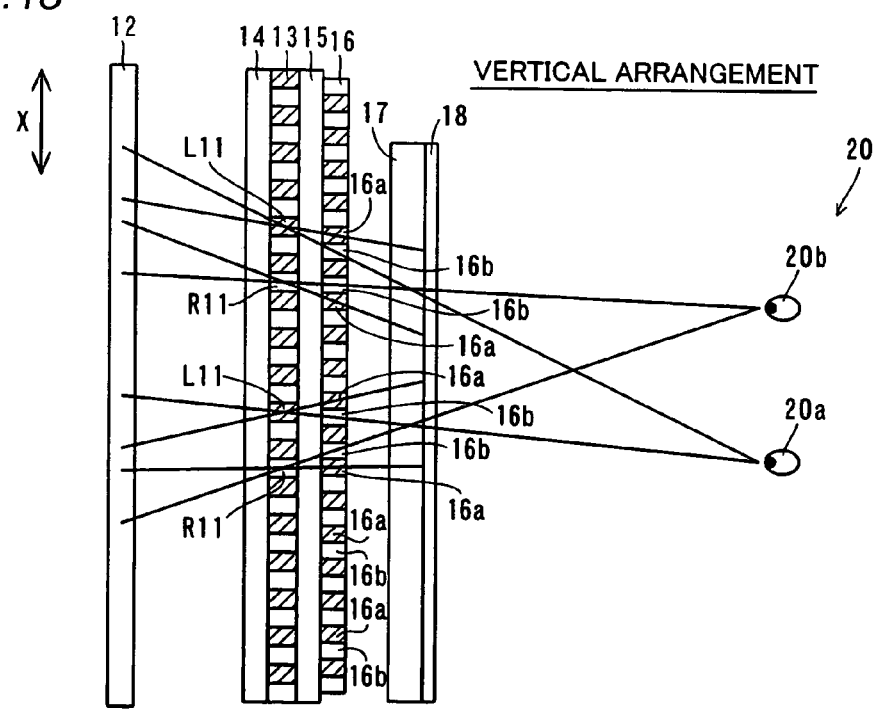
FIG. 18 illustrates a display panel of the image display according to the second embodiment of the present invention shown in FIG. 16 in a state vertically arranged for displaying stereoscopic images and observed by an observer from above.

Referring to FIGS. 16 to 18, a retardation plate 16 is integrally formed on a polarizing plate 15 in an image display 11 according to a second embodiment of the present invention, dissimilarly to the aforementioned first embodiment. The structure of the image display 11 according to the second embodiment is similar to that of the aforementioned first embodiment except that the retardation plate 16 is integrally formed on the polarizing plate 15, and hence redundant description is not repeated.

The image display 11 according to the second embodiment of the present invention comprises a backlight 12, a display panel 12, arranged on a light-emitting side of the backlight 12, formed by a liquid crystal display panel displaying images, polarizing plates 14 and 15 arranged to hold the display panel 13 therebetween, the retardation plate 16 arranged on a light-emitting side of the polarizing plate 15, a polarization control liquid crystal panel 17 arranged on a light-emitting side of the retardation plate 16 and a polarizing plate 18 arranged on a light-emitting side of the polarization control liquid crystal panel 17. The retardation plate 16 is an example of the "first polarization axis control means" in the present invention. According to the present invention, the "display means" is a concept including the display panel 13 and the polarizing plates 14 and 15.

According to the second embodiment, the retardation plate 16 is integrally formed on the polarizing plate 15 arranged on the side of the display panel 13 closer to the polarization control liquid crystal panel 17 (see FIG. 16), as shown in FIG. 17. The retardation plate 16 includes a plurality of polarization control areas 16a and a plurality of polarization control areas 16b. The polarization control areas 16a are examples of the "first polarization control areas" in the present invention, and the polarization control areas 16b are examples of the "second polarization control areas" in the present invention. When the display panel 13 is vertically arranged (when a reference side 13i of the display panel 13 is arranged in a direction Y), the polarization control areas 16a are arranged on lines connecting areas of the display panel 13 displaying left-eye images L11 and the right eye 20b of an observer 20 with each other and lines connecting areas of the display panel 13 displaying right-eye images R11 and the left eye 20a of the observer 20 with each other, as shown in FIG. 18. Further, the polarization control areas 16b are arranged on lines connecting the areas of the display panel 13 displaying the left-eye images L11 and the left eye 20a with each other and lines connecting the areas of the display panel 13 displaying the right-eye images R11 and the right eye 20b with each other. When the display panel 13 is vertically arranged, further, the longer sides of the polarization control areas 16a and 16b of the retardation plate 16 are arranged in the direction Y substantially perpendicular to a line segment connecting the left and right eyes 20a and 20b (see FIG. 16) with each other. The polarization control areas 16a and 16b of the retardation plate 16 have a function of changing the polarization axis of transmitted light to that line-symmetrical with respect to the polarization axis of the retardation plate 16. More specifically, the retardation plate 16, having a function of supplying a retardation $\lambda/2$ to incident light, converts light having a polarization axis of an angle $\alpha$ with respect to the polarization axis of the retardation plate 16, for example, to light having a polarization axis of an angle $-\alpha$ and discharges the same.

According to the second embodiment, the polarization control areas 16a and 16b of the retardation plate 16 are arranged checkerwise (stepwise) along an oblique direction C intersecting with both of a direction X and the direction Y shown in FIG. 17 to correspond to the areas of the display panel 13 displaying the left- and right-eye images L11 and R11, as shown in FIG. 17.

(Effects of the Second Embodiment)

Figure 19:
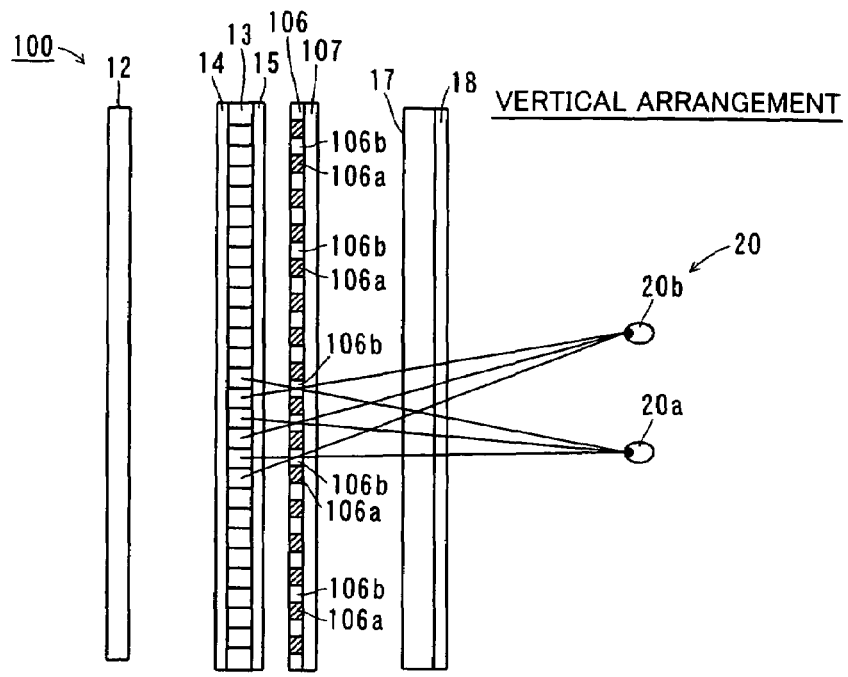
FIG. 19 illustrates an image display employing a general retardation plate according to comparative example for the second embodiment shown in FIG. 16.
Figure 20:
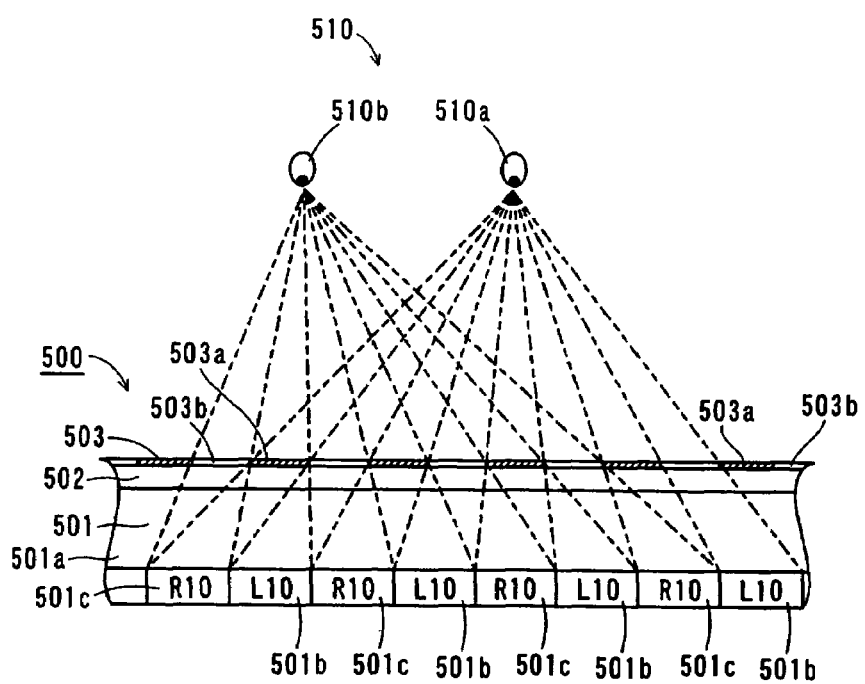
FIG. 20 is a plan view for illustrating the principle of an exemplary conventional stereoscopic image display.

According to the second embodiment, as hereinabove described, the retardation plate 16 is so integrally provided on the polarizing plate 15 that the number of components can be reduced and the image display 11 can be downsized. This effect is now described in detail with reference to FIG. 19 showing an image display 100 employing a general retardation plate 106 according to comparative example. In the image display 100 employing the general retardation plate 106 according to comparative example shown in FIG. 19, the retardation plate 106 arranged on a light-emitting side of a polarizing plate 15 is integrally formed on a dedicated glass substrate 107. A display panel 13 formed independently of the retardation plate 106 and the dedicated glass substrate 107 and polarizing plates 14 and 15 arranged to hold the display panel 13 therebetween are arranged between the retardation plate 106 and a backlight 12. On the contrary, the retardation plate 16 is integrally provided on the polarizing plate 15 in the image display 11 according to the second embodiment shown in FIG. 16 so that the image display 11 requires no dedicated glass substrate 107 for forming the retardation plate 106 dissimilarly to the image display 100 employing the general retardation plate 106 according to comparative example shown in FIG. 19, whereby the number of components can be reduced and the thickness of the image display 11 can be reduced. Consequently, the image display 11 can be downsized as compared with the image display 100 according to comparative example.

Although the present invention has been described and illustrated in detail, it is clearly understood that the same is by way of illustration and example only and is not to be taken by way of limitation, the spirit and scope of the present invention being limited only by the terms of the appended claims.

For example, while the polarization control areas of the retardation plate are provided in correspondence to the respective ones of the dot areas and the polarization control areas of the polarization control liquid crystal panel are provided in the width corresponding to that of the dot areas in each of the aforementioned first and second embodiments, the present invention is not restricted to this but the polarization control areas of the retardation plate may alternatively be provided in correspondence to the respective ones of the pixel areas, for example, and the polarization control areas of the polarization control liquid crystal panel may alternatively be provided in a width corresponding to the width of the plurality of dot areas.

While the polarization control areas of the retardation plate are arranged checkerwise (stepwise) to extend in the oblique direction C in each of the aforementioned first and second embodiments, the present invention is not restricted to this but the polarization control areas of the retardation plate may alternatively be arranged to extend in a prescribed direction (direction Y in FIG. 9 or 17) or to extend non-checkerwise (non-stepwise) in another oblique direction. In order to provide stereoscopic images to a plurality of observers in each of the aforementioned first and second embodiments, the polarization control areas of the retardation plate may be arranged to extend non-checkerwise (non-stepwise) in another oblique direction.

While the polarization control areas 7a and 7b of the polarization control liquid crystal panel 7 are arranged to extend in the prescribed direction in the aforementioned first embodiment, the present invention is not restricted to this but the polarization control areas 7a and 7b of the polarization control liquid crystal panel 7 may alternatively be arranged to extend checkerwise (stepwise) in an oblique direction, similarly to the polarization control areas 6a and 6b of the retardation plate 6.

While the display panel 3 is formed by the 90° TN panel so that the polarizing plates 4 and 5 opposed to each other through the display panel 3 have the polarization axes perpendicular to each other in the aforementioned first embodiment, the present invention is not restricted to this but the display panel 3 may alternatively be formed by a panel of another system such as a VA (vertical alignment) system or an ECB (electrically controlled birefringence) system, for example. When the display panel 3 is formed by a VA panel, for example, the polarizing plates 4 and 5 arranged to hold the display panel 3 therebetween may have the same polarization axes, and the polarization axis of light corresponding to images formed by the image display 1 may be set to correspond to those of the display panel 3 and the polarizing plates 4 and 5.

While the polarization axes of the polarizing plates 4, 5 and 8, the polarization control areas 6a and 6b of the retardation plate 6 and the polarization control liquid crystal panel 7 are set to about 135°, about 45°, about 45°, about 75°, about 15° and about 120° respectively in the aforementioned first embodiment, the present invention is not restricted to this but the polarization axes of the polarizing plates 4, 5 and 8, the polarization control areas 6a and 6b of the retardation plate 6 and the polarization control liquid crystal panel 7 may alternatively be set to values other than the above. In this case, the polarization axes are preferably so optimized as to reduce the quantity of light emitted from the polarization control areas 6b of the retardation plate 6 and transmitted through the polarization control areas 7a of the polarization control liquid crystal panel 7 and the polarizing plate 8 shown in FIG. 12 when the display panel 3 is horizontally arranged. Thus, the quantities of light for the right- and left-eye images introduced into the left and right eyes 10a and 10b of the observer 10 respectively can be reduced.

While the polarization control liquid crystal panel 7 is so arranged that the distance (W1) between the central portion of the display panel 3 in the thickness direction and the surface of the retardation plate 6 closer to the observer 10 and the distance (W2) between the central portion of the display panel 3 in the thickness direction and the surface of the polarization control liquid crystal panel 7 closer to the observer 10 are at the ratio of about 1:3 identical to the aspect ratio (about 1:3) of the dot areas 3a to 3c and 3e to 3g of the display panel 3 in the aforementioned first embodiment, the present invention is not restricted to this but the aforementioned distances (W1 and W2) may alternatively be at a ratio different from the aspect ratio of the dot areas 3a to 3c and 3e to 3g of the display panel 3.

While the display panel 3 is vertically or horizontally arranged for providing stereoscopic images to the observer 10 in the aforementioned first embodiment, the right- and left-images can be more inhibited from entering the left and right eyes 10a and 10b of the observer 10 when the display panel 3 is vertically arranged while the right- and left-eye images partially enter the left and right eyes 10a and 10b of the observer 10 respectively when the display panel 3 is horizontally arranged in the structure of the aforementioned embodiment, and hence the display panel 3 is preferably vertically arranged as a standard state for providing stereoscopic images to the observer 10.

What is claimed is:

1. An image display comprising:
    display means for displaying an image;
    a light source for applying light to said display means;
    first polarization axis control means for separating said light emitted from said light source into light having a first polarization axis and light having a second polarization axis in a state where at least a prescribed reference side of said display means is arranged in a first direction; and
    second polarization axis control means for separating said light emitted from said light source into light having at least two different polarization axes in a state where said prescribed reference side of said display means is arranged in a second direction intersecting with said first direction,
    for providing a stereoscopic image to an observer by progressing either said light having said first polarization axis or said light having said second polarization axis toward the eyes of said observer in said state where said prescribed reference side of said display means is arranged in said first direction, and
    providing said stereoscopic image to said observer by progressing light, having at least one said polarization axis, included in said light having at least two different polarization axes toward the eyes of said observer in said state where said prescribed reference side of said display means is arranged in said second direction.

2. The image display according to claim 1, wherein said second polarization control means includes a polarization control liquid crystal panel.

3. The image display according to claim 1, wherein said first polarization axis control means includes a retardation plate.

4. The image display according to claim 1, wherein said first polarization axis control means includes a plurality of first polarization control areas for controlling said light emitted from said light source to said light having said first polarization axis and a plurality of second polarization control areas for controlling said light emitted from said light source to said light having said second polarization axis, and said plurality of first polarization control areas and said plurality of second polarization control areas are arranged along a direction intersecting with both of said first direction and said second direction in said state where said prescribed reference side of said display means is arranged in said first direction.

5. The image display according to claim 4, wherein
said display means includes a plurality of dot areas for color display, and
said first polarization control areas and said second polarization control areas of said first polarization axis control means are arranged for the respective ones of said dot areas of said display means.

6. The image display according to claim 1, providing a stereoscopic image to said observer by progressing a left-eye image and a right-eye image toward the left eye and the right eye of said observer respectively with either said light having said first polarization axis or said light having said second polarization axis while arranging said prescribed reference side of said display means in said first direction, and providing said stereoscopic image to said observer by progressing said left-eye image and said right-eye image toward the left eye and the right eye of said observer respectively with light, having at least one said light component, included in said light having at least two different polarization axes while arranging said prescribed reference side of said display means in said second direction intersecting with said first direction.

7. The image display according to claim 1, wherein
said second polarization axis control means separates said light having said first polarization axis into light having a third polarization axis and light having a fourth polarization axis while separating said light having said second polarization axis into light having a fifth polarization axis and light having a sixth polarization axis in said state where said prescribed reference side of said display means is arranged in said second direction, for providing said stereoscopic image to said observer by progressing a left-eye image and a right-eye image toward the left eye and the right eye of said observer respectively with said light having said fourth polarization axis and said light having said sixth polarization axis in said state where said prescribed reference side of said display means is arranged in said second direction.

8. The image display according to claim 1, wherein
said second polarization axis control means includes a plurality of third polarization control areas for separating said light having said first polarization axis into light having a third polarization axis and light having a fourth polarization axis and a plurality of fourth polarization control areas for separating said light having said second polarization axis into light having a fifth polarization axis and light having a sixth polarization axis, and said third polarization control areas and said fourth polarization control areas extend substantially perpendicularly to a direction connecting the left and right eyes of said observer with each other and are alternately arranged in a direction along said direction connecting the left and right eyes of said observer with each other in said state where said prescribed reference side of said display means is arranged in said second direction.

9. The image display according to claim 8, wherein
said display means includes three types of dot areas for displaying the three primary colors of light respectively,
the length of said third polarization control areas and said fourth polarization control areas of said second polarization axis control means in said direction along said direction connecting the left and right eyes of said observer with each other is set to substantially correspond to the length of said dot areas in said direction along said direction connecting the left and right eyes of said observer with each other, and said three types of dot areas of said display means for displaying the three primary colors of light respectively are so arranged as to be adjacent to each other substantially perpendicularly to said direction connecting the left and right eyes of said observer with each other in said state where said prescribed reference side of said display means is arranged in said second direction.

10. The image display according to claim 8, wherein
said second polarization axis control means further includes a polarization control liquid crystal panel having said third polarization control areas and said fourth polarization control areas, and said third polarization control areas and said fourth polarization control areas of said polarization control liquid crystal panel are formed with electrodes for applying voltage to liquid crystals respectively, to extend in the same direction as said third polarization control areas and said fourth polarization control areas.

11. The image display according to claim 1, wherein
said second polarization axis control means is switchable between a first state transmitting either said light having said first polarization axis or said light having said second polarization axis by controlling said polarization axes and a second state transmitting both of said light having said first polarization axis and said light having said second polarization axis without controlling said polarization axes in said state where said prescribed reference side of said display means is arranged in said first direction, for providing said stereoscopic image to said observer in said first state of said second polarization axis control means transmitting either said light having said first polarization axis or said light having said second polarization axis by controlling said polarization axes in said state where said prescribed reference side of said display means is arranged in said first direction, and providing a planar image to said observer by progressing both of said light having said first polarization axis and said light having said second polarization axis toward the eyes of said observer in said second state of said second polarization axis control means transmitting both of said light having said first polarization axis and said light having said second polarization axis without controlling said polarization axes in said state where said prescribed reference side of said display means is arranged in said first direction.

12. The image display according to claim 1, wherein
said second polarization axis control means is switchable between a third state separating said light having said first polarization axis into light having a third polarization axis and light having a fourth polarization axis and separating said light having said second polarization axis into light having a fifth polarization axis and light having a sixth polarization axis while transmitting at least either said light having said fourth polarization axis or said light having said sixth polarization axis and a fourth state transmitting both of said light having said first polarization axis and said light having said second polarization axis without controlling said polarization axes in said state where said prescribed reference side of said display means is arranged in said second direction, for providing said stereoscopic image to said observer with said light having said fourth polarization axis and said light having said sixth polarization axis in said state where said prescribed reference side of said display means is arranged in said second direction and in said third state transmitting at least either said light having said fourth polarization axis or said light having said sixth polarization axis, and providing a planar image to said observer by progressing both of said light having said first polarization axis and said light having said second polarization axis toward the eyes of said observer in said state where said prescribed reference side of said display means is arranged in said second direction and in said fourth state of said second polarization axis control means transmitting both of said light having said first polarization axis and said light having said second polarization axis without controlling said polarization axes.

13. The image display according to claim 1, wherein said first polarization axis control means is integrally provided on said display means.

14. The image display according to claim 13, wherein said first polarization axis control means includes a retardation plate.

15. The image display according to claim 13, wherein said display means includes a display panel and a pair of polarizing plates so arranged as to hold said display panel therebetween, and said first polarization axis control means is integrally formed on one said polarizing plate.

16. The image display according to claim 15, wherein said first polarization axis control means is integrally formed on said one polarizing plate arranged on the side of said display means closer to said second polarization axis control means.

17. The image display according to claim 1, wherein said second polarization axis control means, said first polarization axis control means, said display means and said light source are arranged in this order from the side of said observer.

* * * * *